(12) United States Patent
Chen et al.

(10) Patent No.: US 9,986,534 B2
(45) Date of Patent: May 29, 2018

(54) TRANSPORT BLOCK SIZE DETERMINATION METHOD, BASE STATION AND TERMINAL

(71) Applicant: ZTE CORPORATION, Shenzhen, Guangdong Province (CN)

(72) Inventors: Zewei Chen, Shenzhen (CN); Bo Dai, Shenzhen (CN); Jun Xu, Shenzhen (CN); Jin Xu, Shenzhen (CN); Wei Gou, Shenzhen (CN); Zhisong Zuo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 169 days.

(21) Appl. No.: 14/889,861

(22) PCT Filed: Apr. 14, 2014

(86) PCT No.: PCT/CN2014/000407
§ 371 (c)(1),
(2) Date: Nov. 9, 2015

(87) PCT Pub. No.: WO2014/180162
PCT Pub. Date: Nov. 13, 2014

(65) Prior Publication Data
US 2016/0081063 A1    Mar. 17, 2016

(30) Foreign Application Priority Data

May 9, 2013  (CN) .......................... 2013 1 0169046

(51) Int. Cl.
*H04W 4/00*  (2018.01)
*H04W 72/02*  (2009.01)
(Continued)

(52) U.S. Cl.
CPC .......... *H04W 72/02* (2013.01); *H04L 1/0016* (2013.01); *H04L 5/005* (2013.01); *H04L 5/0023* (2013.01);
(Continued)

(58) Field of Classification Search
CPC ..................................... H04L 1/0016
See application file for complete search history.

(56) References Cited

U.S. PATENT DOCUMENTS

| | | | |
|---|---|---|---|
| 2010/0303016 A1* | 12/2010 | Jin | H04L 27/0008 370/328 |
| 2014/0313985 A1* | 10/2014 | Nimbalker | H04L 27/0012 370/329 |
| 2015/0043526 A1* | 2/2015 | Wang | H04L 1/0003 370/330 |

FOREIGN PATENT DOCUMENTS

| CN | 101902313 A | 12/2010 |
|---|---|---|
| CN | 101917253 A | 12/2010 |

OTHER PUBLICATIONS

ETSI TS 136 213 V10.1.0 (Apr. 2011) Techinical Specification Evolved Univeral Terrestrial Radio Access (E-UTRA) Physical layer procedures.*

* cited by examiner

*Primary Examiner* — Huy D Vu
*Assistant Examiner* — Kevin Cunningham
(74) *Attorney, Agent, or Firm* — Ling Wu; Stephen Yang; Ling and Yang Intellectual Property

(57) ABSTRACT

The present document provides a method for determining transport block size (TBS), a base station and a terminal, including: a terminal receives downlink control signaling transmitted by a base station, obtains a combination of I'$_{TBS}$ and N'$_{PRB}$, {I$_{TBS}$, N'$_{PRB}$}, and selects a mapping way to determine transport block size according to {I'$_{TBS}$, N'$_{PRB}$}, (Continued)

---

A terminal receives downlink control signaling transmitted by a base station, obtains a combination of $I'_{TBS}$ and $N'_{PRB}$, that is $\{I'_{TBS}, N'_{PRB}\}$, according to the downlink control signaling ⟶ 10

The terminal selects a mapping way, determines a TBS ⟶ 20 wherein, the mapping way includes at least one of following rules: a first rule, using high-layer TBS to obtain low-layer TBS according to $\{I'_{TBS}, N'_{PRB}\}$; a second rule, obtaining TBS according to the $\{I'_{TBS}, N'_{PRB}\}$ and a mapping relationship table pre-created; a third rule, determining a mapping factor according to the $\{I'_{TBS}, N'_{PRB}\}$, obtaining $\{I_{TBS}, N_{PRB}\}$ according to the $\{I'_{TBS}, N'_{PRB}\}$ and mapping factor, then determining TBS according to the $\{I_{TBS}, N_{PRB}\}$ and a related $\{I_{TBS}, N_{PRB}\}$ and TBS mapping relationship table, wherein the mapping factor is a real number greater than 0.

20 Claims, 2 Drawing Sheets

(51) Int. Cl.
*H04L 1/00* (2006.01)
*H04L 5/00* (2006.01)
*H04W 72/04* (2009.01)
*H04L 1/16* (2006.01)

(52) U.S. Cl.
CPC ......... *H04W 72/042* (2013.01); *H04L 1/1671* (2013.01)

TRANSPORT BLOCK SIZE DETERMINATION METHOD, BASE STATION AND TERMINAL

TECHNICAL FIELD

The embodiments of the present document relate to the field of mobile wireless communications, and more particularly, to a method, a base station and a terminal for determining a transport block size in a sub-frame in the wireless communication system.

BACKGROUND OF THE RELATED ART

In the mobile communication system, in order to fight the time-varying characteristic of the wireless fading channel and improve the system throughput, there has appeared the technology which adaptively adjusts the transmission power of the transmitter, modulation and coding scheme and data frame length based on the channel state to obtain the best communication effect, and the technology is known as the adaptive coding and modulation technology, which is the most typical link adaptation technology.

In the Long Term Evolution (LTE) system, the control signaling which needs to be transmitted in the uplink is Acknowledgement/Negative Acknowledgement (ACK/NACK) messages, and three forms which reflect the channel state information (CSI) of the downlink physical channel: a channel quality indication (CQI), a pre-coding matrix indicator (PMI), and a rank indicator. The user equipment (UE) reports the CSI to the base station through the physical uplink control channel (PUCCH) and physical downlink shared channel (PDSCH).

The base station performs scheduling according to the CSI, determines the transmission resource size, frequency location, modulation and coding scheme, the number of the layers for the multiple-input multiple-output spatial multiplexing and the pre-coding matrix for the downlink data, and transmits the downlink data and downlink control information (DCI) on $N_{PRB}$ physical resource blocks (PRB). The downlink control information carries two kinds of information which are $I_{MCS}$ and $N_{PRB}$. $I_{MCS}$ essentially corresponds to one modulation and coding scheme combination, thereby the terminal can obtain the modulation scheme of the downlink data which is used for demodulation. To obtain the downlink TBS, the terminal looks up the table according to the $I_{MCS}$ to obtain the TBS index $I_{TBS}$, and then looks up the table according to the $I_{TBS}$ and $N_{PRB}$ to obtain the TBS which is used for decoding the downlink data. In the LTE 36-213 protocol, it defines that, when the number of the spatial multiplexing layers equals to 1, the TBS is given by the element ($I_{TBS}$, $N_{PRB}$) in table 1.

TABLE 1

TBS under one-layer spatial multiplexing with the system bandwidth being 10 PRBs

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

However, for the multi-layer spatial multiplexing, the TBS is obtained from the corresponding table according to $N_{PRB}$. Taking the two-layer spatial multiplexing as an example, for $1 \leq N_{PRB} \leq 55$, the TBS is given by the element ($I_{TBS}$, $2 \cdot N_{PRB}$) in table 1; for $56 \leq N_{PRB} \leq 110$, the element ($I_{TBS}$, $N_{PRB}$) in table 1 is obtained firstly which is taken as the one-layer TBS (TBS_L1), and then the one-layer to two-layer TBS mapping table (i.e. table 2) under the condition of two-layer spatial multiplexing is looked up to obtain the two-layer TBS (TBS_L2). For the more-layer spatial multiplexing, the LTE protocol 36.213 defines the one-layer to more-layer TBS mapping table, the method for obtaining the TBS is same with that of the two-layer spatial multiplexing, which will not be described repeatedly here.

TABLE 2

One-layer to two-layer TBS mapping table under the condition of two-layer spatial multiplexing.

| TBS_L1 | TBS_L2 |
|---|---|
| 1544 | 3112 |
| 1608 | 3240 |
| 1672 | 3368 |
| 1736 | 3496 |
| 1800 | 3624 |
| 1864 | 3752 |
| 1928 | 3880 |
| 1992 | 4008 |
| 2024 | 4008 |
| 2088 | 4136 |
| 2152 | 4264 |
| 2216 | 4392 |
| 2280 | 4584 |
| 2344 | 4776 |
| 2408 | 4776 |
| 2472 | 4968 |
| 2536 | 5160 |
| 2600 | 5160 |
| 2664 | 5352 |
| 2728 | 5544 |
| 2792 | 5544 |
| 2856 | 5736 |
| 2984 | 5992 |
| 3112 | 6200 |
| 3240 | 6456 |
| 3368 | 6712 |
| 3496 | 6968 |
| 3624 | 7224 |
| 3752 | 7480 |
| 3880 | 7736 |
| 4008 | 7992 |
| 4136 | 8248 |
| 4264 | 8504 |
| 4392 | 8760 |
| 4584 | 9144 |
| 4776 | 9528 |
| 4968 | 9912 |
| 5160 | 10296 |
| 5352 | 10680 |
| 5544 | 11064 |
| 5736 | 11448 |
| 5992 | 11832 |
| 6200 | 12576 |
| 6456 | 12960 |
| 6712 | 13536 |
| 6968 | 14112 |
| 7224 | 14688 |
| 7480 | 14688 |
| 7736 | 15264 |
| 7992 | 15840 |
| 8248 | 16416 |
| 8504 | 16992 |
| 8760 | 17568 |
| 9144 | 18336 |
| 9528 | 19080 |
| 9912 | 19848 |
| 10296 | 20616 |
| 10680 | 21384 |
| 11064 | 22152 |
| 11448 | 22920 |
| 11832 | 23688 |
| 12216 | 24496 |
| 12576 | 25456 |
| 12960 | 25456 |
| 13536 | 27376 |
| 14112 | 28336 |
| 14688 | 29296 |
| 15264 | 30576 |
| 15840 | 31704 |
| 16416 | 32856 |
| 16992 | 34008 |
| 17568 | 35160 |
| 18336 | 36696 |
| 19080 | 37888 |
| 19848 | 39232 |
| 20616 | 40576 |
| 21384 | 42368 |
| 22152 | 43816 |
| 22920 | 45352 |
| 23688 | 46888 |
| 24496 | 48936 |
| 25456 | 51024 |
| 26416 | 52752 |
| 27376 | 55056 |
| 28336 | 57336 |
| 29296 | 59256 |
| 30576 | 61664 |
| 31704 | 63776 |
| 32856 | 66592 |
| 34008 | 68808 |
| 35160 | 71112 |
| 36696 | 73712 |
| 37888 | 76208 |
| 39232 | 78704 |
| 40576 | 81176 |
| 42368 | 84760 |
| 43816 | 87936 |
| 45352 | 90816 |
| 46888 | 93800 |
| 48936 | 97896 |
| 51024 | 101840 |
| 52752 | 105528 |
| 55056 | 110136 |
| 57336 | 115040 |
| 59256 | 119816 |
| 61664 | 124464 |
| 63776 | 128496 |
| 66592 | 133208 |
| 68808 | 137792 |
| 71112 | 142248 |
| 73712 | 146856 |
| 75376 | 149776 |

After the modulation scheme is given by $I_{MCS}$, actual rates of the elements in the same $I_{TBS}$ row collectively correspond to, but not strictly equal to one target rate. Table 1 is just designed according to the target rate, however, in table 2, the two-layer TBS and one-layer TBS have the same target rate, the design of the more-layer TBS also follows the corresponding relationship. For one given TBS, its actual rate is related to the number of the resource elements (RE) which can be used to bear the data in one RB in the downlink transmission. At present, in table 1, the numbers of the REs which can be used in one RE are all assumed as 120, except that the number of the REs which can be used in one RE for the last level, i.e., $I_{TBS}$=26, is assumed as 136. 120 REs are considered for two orthogonal frequency division multiplexing (OFDM) symbols used for control and cell-specific reference signals (CRS) of two antenna ports, and 136 REs are considered for one OFDM symbols used for control and CRSs of four antenna ports. However, for some application scenarios, such as a new carrier type (NCT), the situation that, 156 REs are all used to bear the data, except 12 REs are used for demodulation reference signals (DMRS) in one RB, exists. At this point, if the above way for determining the TBS is directly used, it will cause the actual rate corresponding to the TBS to be decreased, thereby reducing the system frequency spectrum efficiency. In other application scenarios, for example, when one transport block is transmitted on a plurality of sub-frames, the corresponding resources used to bear data will also be increased. In conclusion, since the related TBS determining way is designed based on that the number of the REs which can be used in 1RB is 120 or 136, but in the new application scenarios, the number of the REs which can be used may be different. If the related TBS determining way is directly used, it will cause that the actual rate of the TBS is less than the target rate, and the system frequency spectrum efficiency is reduced. In order to improve the frequency spectrum efficiency and throughput in the new application scenarios effectively, it is necessary to re-consider the TBS design method.

SUMMARY

The embodiment of the present document provides a method, a base station and a terminal for determining a transport block size in a sub-frame to solve the problem of reduced frequency spectrum efficiency under part of scenarios.

To solve the above problem, the embodiment of the present document provides a method for determining a transport block size, comprising:

a terminal receiving downlink control signaling transmitted by a base station, and obtaining a combination of $I'_{TBS}$ and $N'_{PRB}$, which is $\{I'_{TBS}, N'_{PRB}\}$, according to the downlink control signaling;

the terminal selecting a mapping way, determining a transport block size (TBS) according to the $\{I'_{TBS}, N'_{PRB}\}$, wherein, the mapping way at least comprises one of the following rules:

a first rule: using a high-layer TBS to obtain a low-layer TBS according to the $\{I'_{TBS}, N'_{PRB}\}$;

a second rule: obtaining a TBS according to the $\{I'_{TBS}, N'_{PRB}\}$ and a mapping relationship table pre-created;

a third rule: determining a mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, and then determining a TBS according to the $\{I_{TBS}, N_{PRB}\}$ and a related $\{I_{TBS}, N_{PRB}\}$ and TBS mapping relationship table, wherein the mapping factor is a real number greater than 0.

The above-mentioned method can be further characterized in that: only when a predetermined condition is satisfied, the terminal selects the mapping way, the predetermined condition comprises at least one of the following conditions, wherein:

a number of resource elements which can be used in one resource block is greater than a pre-set value;

or it is a scenario that there is no cell-specific reference signal transmitted in a sub-frame, and a number of the resource elements occupied by demodulation reference signals is 12; or it is a multi-sub-frame scheduling scenario, i.e., a transport block is transmitted in a plurality of sub-frames.

The above-mentioned method can be further characterized in that: the pre-set value is 120, 136 or 168.

The above-mentioned method can be further characterized in that: said using a high-layer TBS to obtain a low-layer TBS at least comprises one of the following:

using a TBS with L=2 to obtain a TBS with RI=1;
using a TBS with L=3 to obtain a TBS with RI=1 or a TBS with RI=2;
using a TBS with L=4 to obtain a TBS with RI=1 or a TBS with RI=2 or a TBS with RI=3;

wherein, L is a number of high layers, RI is a number of low layers.

The above-mentioned method can be further characterized in that: said using a high-layer TBS to obtain a low-layer TBS comprises:

determining a mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, taking a TBS obtained according to the $\{I_{TBS}, N_{PRB}\}$ and a related high-layer TBS determining way as the low-layer TBS The above-mentioned method can be further characterized in that: the mapping relationship table in the second rule is a first mapping relationship table from $\{I'_{TBS}, N'_{PRB}\}$ to a TBS; said obtaining a TBS according to the $\{I'_{TBS}, N'_{PRB}\}$ and a mapping relationship table pre-created comprises: looking up the first mapping relationship table according to the $\{I'_{TBS}, N'_{PRB}\}$ to obtain the TBS;

or, the mapping relationship table in the second rule is a second mapping relationship table from a temporary TBS to a required TBS; said obtaining a TBS according to the $\{I'_{TBS}, N'_{PRB}\}$ and a mapping relationship table pre-created comprises: obtaining the temporary TBS according to $\{I'_{TBS}, N'_{PRB}\}$ and a related TBS determining way, and looking up the second mapping relationship table according to the temporary TBS to obtain the TBS.

The above-mentioned method can be further characterized in that: said obtaining $\{I_{TBS}, N_{PRB}\}$ according to the $\{I'_{TBS}, N'_{PRB}\}$ and the mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\operatorname{round}\left(\frac{N'_{PRB} \times F \times RI}{L}\right), 110\right);$$

wherein, the L≥RI, the F is a mapping factor, the F is a real number greater than 0, round represents taking a nearest integer, and in the first rule, the L, RI represent that an RI-layer TBS is obtained according to an L-layer TBS, and L>RI; in the third rule, L=RI.

The above-mentioned method can be further characterized in that: said determining a mapping factor according to the $\{I'_{TBS}, N'_{PRB}\}$ comprises:

dividing the $\{I'_{TBS}, N'_{PRB}\}$ into n subsets, each subset corresponding to one mapping factor, wherein, the n is greater than or equal to 1.

The above-mentioned method can be further characterized in that: said dividing the $\{I'_{TBS}, N'_{PRB}\}$ into n subsets, each subset corresponding to one mapping factor at least comprises one of the following:

n=4, when A1≤$N'_{PRB}$≤A2 and/or B1≤$I'_{TBS}$≤B2, the mapping factor is F1; when A3≤$N'_{PRB}$≤A4 and/or B3≤$I'_{TBS}$≤B4, the mapping factor is F2; when A5≤$N_{PRB}$≤A6 and/or B5≤$I'_{TBS}$≤B6, the mapping factor is F3; when A7≤$N'_{PRB}$≤A8 and/or B7≤$I'_{TBS}$≤B8, the mapping factor is F4;

n=3, when A1≤$N'_{PRB}$≤A2 and/or B1≤$I'_{TBS}$≤B2, the mapping factor is F1; when A3≤$N'_{PRB}$≤A4 and/or B3≤$I'_{TBS}$≤B4, the mapping factor is F2; when A5≤$N_{PRB}$≤A6 and/or B5≤$I'_{TBS}$≤B6, the mapping factor is F3;

n=2, when A1≤$N'_{PRB}$≤A2 and/or B1≤$I'_{TBS}$≤B2, the mapping factor is F1; when A3≤$N'_{PRB}$≤A4 and/or B3≤$I'_{TBS}$≤B4, the mapping factor is F2;

the above Ai and Bi satisfy Ai≥1; Bi≥1, i=1, 2, 3, . . . , 8.

The above-mentioned method can be further characterized in that: the terminal selecting a mapping way, comprises:

the terminal selecting one of the first rule, second rule and third rule for all the $\{I'_{TBS}, N'_{PRB}\}$;

or, the terminal selecting the mapping way according to the $\{I'_{TBS}, N'_{PRB}\}$.

The above-mentioned method can be further characterized in that: the terminal selecting the mapping way according to the $\{I'_{TBS}, N'_{PRB}\}$ comprises:

for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the third rule, wherein the Ci and Di satisfy $Ci \geq 1$; $Di \geq 1$, i=1, 2, 3, 4.

The above-mentioned method can be further characterized in that: the terminal selecting the mapping way according to the $\{I'_{TBS}, N'_{PRB}\}$ comprises:

for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the second rule, wherein, the Ci and Di satisfy $Ci \geq 1$; $Di \geq 1$, i=1, 2, 3, 4.

The above-mentioned method can be further characterized in that: the terminal selecting the mapping way according to the $\{I'_{TBS}, N'_{PRB}\}$ comprises:

for $C1 \leq N'_{PRB} \leq C2$ and/or $D1 \leq I'_{TBS} \leq D2$, selecting the first rule; for $C5 \leq N'_{PRB} \leq C6$ and/or $D5 \leq I'_{TBS} \leq D6$, selecting the third rule; for $C7 \leq N'_{PRB} \leq C8$ and/or $D7 \leq I'_{TBS} \leq D8$, selecting the second rule, wherein, the Ci and Di satisfy $Ci \geq 1$; $Di \geq 1$, i=1, 2, 3, 4, 5, 6, 7, 8.

The above-mentioned method can be further characterized in that: the terminal selecting the mapping way according to the $\{I'_{TBS}, N'_{PRB}\}$ comprises:

for $C1 \leq N'_{PRB} \leq C2$ and/or $D1 \leq I'_{TBS} \leq D2$, selecting the third rule; for $C3 \leq N'_{PRB} \leq C4$ and/or $D3 \leq I'_{TBS} \leq D4$, selecting the second rule, wherein, the Ci and Di satisfy $Ci \geq 1$; $Di \geq 1$, i=1, 2, 3, 4.

The above-mentioned method can be further characterized in that: the terminal selecting the mapping way according to the $\{I'_{TBS}, N'_{PRB}\}$ comprises:

when there is no CRS transmitted in a sub-frame, and a number of resource elements occupied by DMRSs is 12:

for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the third rule;

or, for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the second rule;

or, for $C1 \leq N'_{PRB} \leq C2$ and/or $D1 \leq I'_{TBS} \leq D2$, selecting the first rule; for $C5 \leq N'_{PRB} \leq C6$ and/or $D5 \leq I'_{TBS} \leq D6$, selecting the third rule; for $C7 \leq N'_{PRB} \leq C8$ and/or $D7 \leq I'_{TBS} \leq D8$, selecting the second rule;

wherein, the Ci and Di satisfy $Ci \geq 1$; $Di \geq 1$, i=1, 2, 3, 4, 5, 6, 7, 8.

The above-mentioned method can be further characterized in that: the terminal selecting a mapping way, comprises:

when multi-sub-frame scheduling is adopted, i.e., one transport block is transmitted in h sub-frames, selecting the first rule, and using the L-layer TBS (L=RI·h) to obtain the RI-layer TBS wherein, the h is greater than or equal to 1.

The above-mentioned method can be further characterized in that: the terminal selecting a mapping way, comprises:

when multi-sub-frame scheduling is adopted, i.e., one transport block is transmitted in h sub-frames:

when h<Y, or h≥Y and the $N'_{PRB} \leq X1$, selecting the first rule, and using the L-layer TBS (L=RI·h) to obtain the RI-layer TBS wherein, the h is greater than or equal to 1;

when h≥Y and the $N'_{PRB} \geq X2$, selecting the second rule;

wherein, the X $1 \geq 1$, $X2 \geq 1$, $Y \geq 1$.

The embodiment of the present document further provides a method for determining a transport block size, comprising:

a base station performing scheduling according to channel state information reported by a terminal, determining a combination of $I'_{TBS}$ and $N'_{PRB}$, which is $\{I'_{TBS}, N'_{PRB}\}$; the base station selecting a mapping way, determining a transport block size according to the $\{I'_{TBS}, N'_{PRB}\}$, wherein, the mapping way at least comprises one of the following rules:

a first rule: using a high-layer TBS to obtain a low-layer TBS according to the $\{I'_{TBS}, N'_{PRB}\}$;

a second rule: obtaining a TBS according to the $\{I'_{TBS}, N'_{PRB}\}$ and a mapping relationship table pre-created;

a third rule: determining a mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, and then determining a TBS according to the $\{I_{TBS}, N_{PRB}\}$ and a related $\{I_{TBS}, N_{PRB}\}$ and TBS mapping relationship table, wherein the mapping factor is a real number greater than 0.

The above-mentioned method can be further characterized in that: only when a predetermined condition is satisfied, the base station selects the mapping way, the predetermined condition comprises at least one of the following conditions:

a number of resource elements which can be used in one resource block is greater than a pre-set value;

or it is a scenario that there is no cell-specific reference signal transmitted in a sub-frame, and a number of the resource elements occupied by demodulation reference signals is 12;

or it is a multi-sub-frame scheduling scenario, i.e., a transport block is transmitted in a plurality of sub-frames.

The above-mentioned method can be further characterized in that: the pre-set value is 120, 136 or 168.

The above-mentioned method can be further characterized in that: said using a high-layer TBS to obtain a low-layer TBS at least comprises one of the following:

using a TBS with L=2 to obtain a TBS with RI=1;

using a TBS with L=3 to obtain a TBS with RI=1 or a TBS with RI=2;

using a TBS with L=4 to obtain a TBS with RI=1 or a TBS with RI=2 or a TBS with RI=3;

wherein, L is a number of high layers, RI is a number of low layers.

The above-mentioned method can be further characterized in that: said using a high-layer TBS to obtain a low-layer TBS comprises:

determining a mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, taking a TBS obtained according to the $\{I_{TBS}, N_{PRB}\}$ and a related high-layer TBS determining way as the low-layer TBS.

The above-mentioned method can be further characterized in that: the mapping relationship table in the second rule is a first mapping relationship table from $\{I'_{TBS}, N'_{PRB}\}$ to a TBS; said obtaining a TBS according to the $\{I'_{TBS}, N'_{PRB}\}$ and a mapping relationship table pre-created comprises: looking up the first mapping relationship table according to the $\{I'_{TBS}, N'_{PRB}\}$ to obtain the TBS;

or, the mapping relationship table in the second rule is a second mapping relationship table from a temporary TBS to a required TBS; said obtaining a TBS according to the $\{I'_{TBS}, N'_{PRB}\}$ and a mapping relationship table pre-created comprises: obtaining the temporary TBS according to $\{I'_{TBS}, N'_{PRB}\}$ and a related TBS determining way, and looking up the second mapping relationship table according to the temporary TBS to obtain the TBS.

The above-mentioned method can be further characterized in that: said obtaining $\{I_{TBS}, N_{PRB}\}$ according to the $\{I'_{TBS}, N'_{PRB}\}$ and the mapping factor comprises:

$$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the L≥RI, the F is a mapping factor, the F is a real number greater than 0, round represents taking a nearest integer, and in the first rule, the L, RI represent that an RI-layer TBS is obtained according to an L-layer TBS, and L>RI; in the third rule, L=RI.

The above-mentioned method can be further characterized in that: said determining a mapping factor according to the $I'_{TBS}$, $N'_{PRB}\}$ comprises:

Dividing the $\{I'_{TBS}, N'_{PRB}\}$ into n subsets, each subset corresponding to one mapping factor, wherein, the n is greater than or equal to 1.

The above-mentioned method can be further characterized in that: said dividing the $\{I'_{TBS}, N'_{PRB}\}$ into n subsets, each subset corresponding to one mapping factor at least comprises one of the following:

n=4, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2; when A5≤N$_{PRB}$≤A6 and/or B5≤I'$_{TBS}$≤B6, the mapping factor is F3; when A7≤N'$_{PRB}$≤A8 and/or B7≤I'$_{TBS}$≤B8, the mapping factor is F4;

n=3, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2; when A5≤N$_{PRB}$≤A6 and/or B5≤I'$_{TBS}$≤B6, the mapping factor is F3;

n=2, when A1≤N$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2;

the above Ai and Bi satisfy Ai≥1; Bi≥1, i=1, 2, 3, . . . , 8.

The above-mentioned method further can have the following characteristics: the base station selecting a mapping way comprises:

the base station selecting one of the first rule, second rule and third rule for all the $\{I'_{TBS}, N'_{PRB}\}$;

or, the base station selecting the mapping way according to the $\{I'_{TBS}, N'_{PRB}\}$.

The above-mentioned method can be further characterized in that: the base station selecting the mapping way according to the $\{I'_{TBS}, N'_{PRB}\}$ comprises:

for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the third rule, wherein the Ci and Di satisfy Ci≥1; Di≥1, i=1, 2, 3, 4.

The above-mentioned method can be further characterized in that: the base station selecting the mapping way according to the $\{I'_{TBS}, N'_{PRB}\}$ comprises:

for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the second rule, wherein, the Ci and Di satisfy Ci≥1; Di≥1, i=1, 2, 3, 4.

The above-mentioned method can be further characterized in that: the base station selecting the mapping way according to the $\{I'_{TBS}, N'_{PRB}\}$ comprises:

for C1≤N'$_{PRB}$≤C2 and/or D1≤I'$_{TBS}$≤D2, selecting the first rule; for C5≤N'$_{PRB}$≤C6 and/or D5≤I'$_{TBS}$≤D6, selecting the third rule; for C7≤N'$_{PRB}$≤C8 and/or D7≤I'$_{TBS}$≤D8, selecting the second rule, wherein, the Ci and Di satisfy Ci≥1; Di≥1, i=1, 2, 3, 4, 5, 6, 7, 8.

The above-mentioned method can be further characterized in that: the base station selecting the mapping way according to the $\{I'_{TBS}, N'_{PRB}\}$ comprises:

for C1≤N'$_{PRB}$≤C2 and/or D1≤I'$_{TBS}$≤D2, selecting the third rule; for C3≤N'$_{PRB}$≤C4 and/or D3≤I'$_{TBS}$≤D4, selecting the second rule, wherein, the Ci and Di satisfy Ci≥1; Di≥1, i=1, 2, 3, 4.

The above-mentioned method can be further characterized in that: the base station selecting the mapping way according to the $\{I'_{TBS}, N'_{PRB}\}$ comprises:

when there is no CRS transmitted in a sub-frame, and a number of resource elements occupied by DMRSs is 12:

for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the third rule;

or, for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the second rule;

or, for C1≤N$_{PRB}$≤C2 and/or D1≤I'$_{TBS}$≤D2, selecting the first rule; for C5≤N'$_{PRB}$≤C6 and/or D5≤I'$_{TBS}$≤D6, selecting the third rule; for C7≤N'$_{PRB}$≤C8 and/or D7≤I'$_{TBS}$≤D8, selecting the second rule;

wherein, the Ci and Di satisfy Ci≥1; Di≥1, i=1, 2, 3, 4, 5, 6, 7, 8.

The above-mentioned method can be further characterized in that: the base station selecting a mapping way comprises:

when multi-sub-frame scheduling is adopted, i.e., one transport block is transmitted in h sub-frames, selecting the first rule, and using the L-layer TBS (L=RI·h) to obtain the RI-layer TBS wherein, the h is greater than or equal to 1.

The above-mentioned method can be further characterized in that: the base station selecting a mapping way comprises:

when multi-sub-frame scheduling is adopted, i.e., one transport block is transmitted in h sub-frames:

when h<Y, or h≥Y and the N'$_{PRB}$≤X1, selecting the first rule, and using the L-layer TBS (L=RI·h) to obtain the RI-layer TBS, wherein, the h is greater than or equal to 1;

when h≥Y and the N'$_{PRB}$≥X2, selecting the second rule; wherein, the X 1≥1, X2≥1, Y≥1.

The embodiments of the present document further provide a terminal, comprising:

a first determination unit, configured to receive downlink control signaling transmitted by a base station, and obtain a combination of I'$_{TBS}$ and N'PRB, which is $\{I'_{TBS}, N'_{PRB}\}$, according to the downlink control signaling;

a second determination unit, configured to select a mapping way, determine a transport block size (TBS) according to the $\{I'_{TBS}, N'_{PRB}\}$, wherein, the mapping way at least comprises one of the following rules:

a first rule: using a high-layer TBS to obtain a low-layer TBS according to the $\{I'_{TBS}, N'_{PRB}\}$;

a second rule: obtaining a TBS according to the $\{I'_{TBS}, N'_{PRB}\}$ and a mapping relationship table pre-created;

a third rule: determining a mapping factor according to the $\{I'_{TBS}, N'_{PRB}\}$, obtaining $\{I_{TBS}, N'_{PRB}\}$ according to the $\{I'_{TBS}, N'_{PRB}\}$ and the mapping factor, and then determining a TBS according to the $\{I_{TBS}, N'_{PRB}\}$ and a related $\{I_{TBS}, N_{PRB}\}$ and TBS mapping relationship table, wherein the mapping factor is a real number greater than 0.

The above-mentioned terminal can be further characterized in that: the second determination unit is further configured to, only when a predetermined condition is satisfied, select the mapping way, the predetermined condition comprises at least one of the following conditions:
a number of resource elements which can be used in one resource block is greater than a pre-set value;
or it is a scenario that there is no cell-specific reference signal transmitted in a sub-frame, and a number of the resource elements occupied by demodulation reference signals is 12;
or it is a multi-sub-frame scheduling scenario, i.e., a transport block is transmitted in a plurality of sub-frames.

The above-mentioned terminal can be further characterized in that: the pre-set value is 120, 136 or 168.

The above-mentioned terminal can be further characterized in that: the second determination unit being configured to use high-layer TBS to obtain low-layer TBS at least comprises one of the following:
using a TBS with L=2 to obtain a TBS with RI=1;
using a TBS with L=3 to obtain a TBS with RI=1 or a TBS with RI=2;
using a TBS with L=4 to obtain a TBS with RI=1 or a TBS with RI=2 or a TBS with RI=3;
wherein, L is a number of high layers, RI is a number of low layers.

The above-mentioned terminal can be further characterized in that: the second determination unit being configured to use a high-layer TBS to obtain a low-layer TBS comprises:
determining a mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, taking a TBS obtained according to the $\{I_{TBS}, N_{PRB}\}$ and a related high-layer TBS determining way as the low-layer TBS.

The above-mentioned terminal can be further characterized in that: the mapping relationship table in the second rule is a first mapping relationship table from $\{I'_{TBS}, N'_{PRB}\}$ to a TBS; the second determination unit being configured to obtain a TBS according to the $\{I'_{TBS}, N'_{PRB}\}$ and a mapping relationship table pre-created comprises: looking up the first mapping relationship table according to the $\{I'_{TBS}, N'_{PRB}\}$ to obtain the TBS;
or, the mapping relationship table in the second rule is a second mapping relationship table from a temporary TBS to a required TBS; the second determination unit being configured to obtain a TBS according to the $\{I'_{TBS}, N'_{PRB}\}$ and a mapping relationship table pre-created comprises: obtaining the temporary TBS according to $\{I'_{TBS}, N'_{PRB}\}$ and a related TBS determining way, and looking up the second mapping relationship table according to the temporary TBS to obtain the TBS.

The above-mentioned terminal can be further characterized in that: the second determination unit being configured to obtain $\{I_{TBS}, N_{PRB}\}$ according to the $\{I'_{TBS}, N'_{PRB}\}$ and the mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the L≥RI, the F is a mapping factor, the F is a real number greater than 0, round represents obtaining a nearest integer, and in the first rule, the L, RI represent that an RI-layer TBS is obtained according to an L-layer TBS, and L>RI; in the third rule, L=RI.

The above-mentioned terminal can be further characterized in that: the second determination unit being configured to determine a mapping factor according to the $\{I'_{TBS}, N'_{PRB}\}$ comprises:
dividing the $\{I'_{TBS}, N'_{PRB}\}$ into n subsets, each subset corresponding to one mapping factor, wherein, the n is greater than or equal to 1.

The above-mentioned terminal can be further characterized in that: the second determination unit being configured to divide the $\{I'_{TBS}, N'_{PRB}\}$ into n subsets, each subset corresponding to one mapping factor, at least comprises one of the following:
n=4, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2; when A5≤N'$_{PRB}$≤A6 and/or B5≤I'$_{TBS}$≤B6, the mapping factor is F3; when A7≤N'$_{PRB}$≤A8 and/or B7≤I'$_{TBS}$≤B8, the mapping factor is F4;
n=3, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2; when A5≤N'$_{PRB}$≤A6 and/or B5≤I'$_{TBS}$≤B6, the mapping factor is F3;
n=2, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2;
the above Ai and Bi satisfy Ai≥1; Bi≥1, i=1, 2, 3, . . . , 8.

The above-mentioned terminal can be further characterized in that: the second determination unit being configured to select a mapping way, comprises:
selecting one of the first rule, second rule and third rule for all the $\{I'_{TBS}, N'_{PRB}\}$;
or, selecting the mapping way according to the $\{I'_{TBS}, N'_{PRB}\}$.

The above-mentioned terminal can be further characterized in that: the second determination unit being configured to select a mapping way according to the $\{I'_{TBS}, N'_{PRB}\}$, comprises:
for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the third rule, wherein the Ci and Di satisfy Ci≥1; Di≥1, i=1, 2, 3, 4.

The above-mentioned terminal can be further characterized in that: the second determination unit being configured to select the mapping way according to the $\{I'_{TBS}, N'_{PRB}\}$, comprises:
for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the second rule, wherein, the Ci and Di satisfy Ci≥1; Di≥1, i=1, 2, 3, 4.

The above-mentioned terminal can be further characterized in that: the second determination unit being configured to select the mapping way according to the $\{I'_{TBS}, N'_{PRB}\}$, comprises:
for C1≤N'$_{PRB}$≤C2 and/or D1≤I'$_{TBS}$≤D2, selecting the first rule; for C5≤N'$_{PRB}$≤C6 and/or D5≤I'$_{TBS}$≤D6, selecting the third rule; for C7≤N'$_{PRB}$≤C8 and/or D7≤I'$_{TBS}$≤D8, selecting the second rule, wherein, the Ci and Di satisfy Ci≥1; Di≥1, i=1, 2, 3, 4, 5, 6, 7, 8.

The above-mentioned terminal can be further characterized in that: the second determination unit being configured to select the mapping way according to the $\{I'_{TBS}, N'_{PRB}\}$ comprises:

for C1≤N'$_{PRB}$≤C2 and/or D1≤I'$_{TBS}$≤D2, selecting the third rule; for C3≤N'$_{PRB}$≤C4 and/or D3≤I'$_{TBS}$≤D4, selecting the second rule, wherein, the Ci and Di satisfy Ci≥1; Di≥1, i=1, 2, 3, 4.

The above-mentioned terminal can be further characterized in that: the second determination unit being configured to select the mapping way according to the {I'$_{TBS}$, N'$_{PRB}$}, comprises:

when there is no CRS transmitted in a sub-frame, and a number of resource elements occupied by DMRSs is 12:

for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the third rule;

or, for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the second rule;

or, for C1≤N'$_{PRB}$≤C2 and/or D1≤I'$_{TBS}$≤D2, selecting the first rule; for C5≤N'$_{PRB}$≤C6 and/or D5≤I'$_{TBS}$≤D6, selecting the third rule; for C7≤N'$_{PRB}$≤C8 and/or D7≤I'$_{TBS}$≤D8, selecting the second rule;

wherein, the Ci and Di satisfy Ci≥1; Di≥1, i=1, 2, 3, 4, 5, 6, 7, 8.

The above-mentioned terminal can be further characterized in that: the second determination unit being configured to select a mapping way, comprises:

when multi-sub-frame scheduling is adopted, i.e., one transport block is transmitted in h sub-frames, selecting the first rule, and using the L-layer TBS (L=RI·h) to obtain the RI-layer TBS, wherein, the h is greater than or equal to 1.

The above-mentioned terminal can be further characterized in that: the second determination unit being configured to select a mapping way, comprises:

when multi-sub-frame scheduling is adopted, i.e., one transport block is transmitted in h sub-frames:

when h<Y, or h≥Y and the N'$_{PRB}$≤X1, selecting the first rule, and using the L-layer TBS (L=RI·h) to obtain the RI-layer TBS, wherein, the h is greater than or equal to 1;

when h≥Y and the N'$_{PRB}$≥X2, selecting the second rule; wherein, the X 1≥1, X2≥1, Y≥1.

The embodiment of the present document further provides a base station, comprising: a third determination unit, configured to perform scheduling according to channel state information reported by a terminal, determine a combination of I'$_{TBS}$ and N'$_{PRB}$, which is {I'$_{TBS}$, N'$_{PRB}$};

a fourth determination unit, configured to select a mapping way, determine a transport block size (TBS) according to the {I'$_{TBS}$, N'$_{PRB}$}, wherein, the mapping way at least comprises one of the following rules:

a first rule: using a high-layer TBS to obtain a low-layer TBS according to the {I'$_{TBS}$, N'$_{PRB}$};

a second rule: obtaining a TBS according to the {I'$_{TBS}$, N'$_{PRB}$} and a mapping relationship table pre-created;

a third rule: determining a mapping factor according to the {I'$_{TBS}$, N'$_{PRB}$}, obtaining {I$_{TBS}$, N'$_{PRB}$} according to the {I'$_{TBS}$, N'$_{PRB}$} and the mapping factor, and then determining a TBS according to the {I$_{TBS}$, N'$_{PRB}$} and a related {I$_{TBS}$, N$_{PRB}$} and TBS mapping relationship table, wherein the mapping factor is a real number greater than 0.

The above-mentioned base station can be further characterized in that: the fourth determination unit is further configured to, only when a predetermined condition is satisfied, select the mapping way, the predetermined condition includes at least one of the following conditions:

a number of resource elements which can be used in one resource block is greater than a pre-set value;

or it is a scenario that there is no cell-specific reference signal transmitted in a sub-frame, and a number of the resource elements occupied by demodulation reference signals is 12;

or it is a multi-sub-frame scheduling scenario, i.e., a transport block is transmitted in a plurality of sub-frames.

The above base station can be further characterized in that, the pre-set value is 120, 136 or 168.

The above-mentioned base station can be further characterized in that: the fourth determination unit being configured to use a high-layer TBS to obtain a low-layer TBS, at least comprises one of the following:

Using a TBS with L=2 to obtain a TBS with RI=1;

using a TBS with L=3 to obtain a TBS with RI=1 or a TBS with RI=2;

using a TBS with L=4 to obtain a TBS with RI=1 or a TBS with RI=2 or a TBS with RI=3;

wherein, L is a number of high layers, RI is a number of low layers.

The above-mentioned base station can be further characterized in that: the fourth determination unit being configured to use a high-layer TBS to obtain a low-layer TBS, comprises:

determining a mapping factor according to the {I'$_{TBS}$, N'$_{PRB}$}, obtaining {I$_{TBS}$, N$_{PRB}$} according to the {I'$_{TBS}$, N'$_{PRB}$} and the mapping factor, taking a TBS obtained according to the {I$_{TBS}$, N$_{PRB}$} and a related high-layer TBS determining way as the low-layer TBS.

The above-mentioned base station can be further characterized in that: the mapping relationship table in the second rule is a first mapping relationship table from {I'$_{TBS}$, N'$_{PRB}$} to a TBS; the fourth determination unit being configured to obtain a TBS according to the {I'$_{TBS}$, N'$_{PRB}$} and a mapping relationship table pre-created comprises: looking up the first mapping relationship table according to the {I'$_{TBS}$, N'$_{PRB}$} to obtain the TBS;

or, the mapping relationship table in the second rule is a second mapping relationship table from a temporary TBS to a required TBS; the fourth determination unit being configured to obtain a TBS according to the {I'$_{TBS}$, N'$_{PRB}$} and a mapping relationship table pre-created comprises: obtaining the temporary TBS according to {I'$_{TBS}$, N'$_{PRB}$} and a related TBS determining way, and looking up the second mapping relationship table according to the temporary TBS to obtain the TBS.

The above-mentioned base station can be further characterized in that: the fourth determination unit being configured to obtain {I$_{TBS}$, N$_{PRB}$} according to the {I'$_{TBS}$, N'$_{PRB}$} and the mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the L≥RI, the F is a mapping factor, the F is a real number greater than 0, round represents taking a nearest integer, and in the first rule, the L, RI represent that an RI-layer TBS is obtained according to an L-layer TBS, and L>RI; in the third rule, L=RI.

The above-mentioned base station can be further characterized in that: the fourth determination unit being configured to determine a mapping factor according to the $\{I'_{TBS}, N'_{PRB}\}$ comprises:

dividing $\{I'_{TBS}, N'_{PRB}\}$ into n subsets, each subset corresponding to one mapping factor, wherein, the n is greater than or equal to 1.

The above-mentioned base station can be further characterized in that: the fourth determination unit being configured to divide the $\{I'_{TBS}, N'_{PRB}\}$ into n subsets, each subset corresponding to one mapping factor, at least comprises one of the following:

n=4, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2; when $A5 \leq N_{PRB} \leq A6$ and/or $B5 \leq I'_{TBS} \leq B6$, the mapping factor is F3; when $A7 \leq N_{PRB} \leq A8$ and/or $B7 \leq I'_{TBS} \leq B8$, the mapping factor is F4;

n=3, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2; when $A5 \leq N_{PRB} \leq A6$ and/or $B5 \leq I'_{TBS} \leq B6$, the mapping factor is F3;

n=2, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2;

the above Ai and Bi satisfy $Ai \geq 1$; $Bi \geq 1$, $i = 1, 2, 3, \ldots, 8$.

The above-mentioned base station can be further characterized in that: the fourth determination unit being configured to select a mapping way, comprises:

the base station selecting one of the first rule, second rule and third rule for all the $\{I'_{TBS}, N'_{PRB}\}$;

or, the base station selecting the mapping way according to the $\{I'_{TBS}, N'_{PRB}\}$.

The above-mentioned base station can be further characterized in that: the fourth determination unit being configured to select the mapping way according to the $\{I_{TBS}, N'_{PRB}\}$, comprises:

for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the third rule, wherein the Ci and Di satisfy $Ci \geq 1$; $Di \geq 1$, $i = 1, 2, 3, 4$.

The above-mentioned base station can be further characterized in that: the fourth determination unit being configured to select the mapping way according to the $\{I'_{TBS}, N'_{PRB}\}$ comprises:

for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the second rule, wherein, the Ci and Di satisfy $Ci \geq 1$; $Di \geq 1$, $i = 1, 2, 3, 4$.

The above-mentioned base station can be further characterized in that: the fourth determination unit being configured to select the mapping way according to the $\{I'_{TBS}, N'_{PRB}\}$, comprises:

for $C1 \leq N'_{PRB} \leq C2$ and/or $D1 \leq I'_{TBS} \leq D2$, selecting the first rule; for $C5 \leq N'_{PRB} \leq C6$ and/or $D5 \leq I'_{TBS} \leq D6$, selecting the third rule; for $C7 \leq N_{PRB} \leq C8$ and/or $D7 \leq I'_{TBS} \leq D8$, selecting the second rule, wherein, the Ci and Di satisfy $Ci \geq 1$; $Di \geq 1$, $i = 1, 2, 3, 4, 5, 6, 7, 8$.

The above-mentioned base station can be further characterized in that: the fourth determination unit being configured to select the mapping way according to the $\{I'_{TBS}, N'_{PRB}\}$, comprises:

for $C1 \leq N'_{PRB} \leq C2$ and/or $D1 \leq I'_{TBS} \leq D2$, selecting the third rule; for $C3 \leq N'_{PRB} \leq C4$ and/or $D3 \leq I'_{TBS} \leq D4$, selecting the second rule, wherein, the Ci and Di satisfy $Ci \geq 1$; $Di \geq 1$, $i = 1, 2, 3, 4$.

The above-mentioned base station can be further characterized in that: the fourth determination unit being configured to select the mapping way according to the $\{I'_{TBS}, N'_{PRB}\}$ comprises:

when there is no CRS transmitted in a sub-frame, and a number of resource elements occupied by DMRSs is 12:

for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the third rule;

or, for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I_{TBS} \leq D4$, selecting the second rule;

or, for $C1 \leq N'_{PRB} \leq C2$ and/or $D1 \leq I'_{TBS} \leq D2$, selecting the first rule; for $C5 \leq N'_{PRB} p \leq C6$ and/or $D5 \leq I'_{TBS} \leq D6$, selecting the third rule; for $C7 \leq N'_{PRB} \leq C8$ and/or $D7 \leq I'_{TBS} \leq D8$, selecting the second rule;

wherein the Ci and Di satisfy $Ci \geq 1$; $Di \geq 1$, $i = 1, 2, 3, 4, 5, 6, 7, 8$.

The above-mentioned base station can be further characterized in that: the fourth determination unit being configured to select a mapping way, comprises:

when multi-sub-frame scheduling is adopted, i.e., one transport block is transmitted in h sub-frames, selecting the first rule, and using the L-layer TBS (L=RI·h) to obtain the RI-layer TBS, wherein, the h is greater than or equal to 1.

The above-mentioned base station can be further characterized in that: the fourth determination unit being configured to select a mapping way, comprises:

when multi-sub-frame scheduling is adopted, i.e., one transport block is transmitted in h sub-frames:

when h<Y, or h≥Y and the $N'_{PRB} \leq X1$, selecting the first rule, and using the L-layer TBS (L=RI·h) to obtain the RI-layer TBS, wherein, the h is greater than or equal to 1;

when h≥Y and the $N'_{PRB} \geq X2$, selecting the second rule;

wherein, the $X \geq 1$, $X2 \geq 1$, $Y \geq 1$.

The method for determining the transport block size provided by the embodiment of the present document applies to the terminal and base station, it provides the corresponding TBS mapping way when the number of the REs which can be used in one RB is changed, and solves the problem of the reduced actual code rate which results from using the related TBS determining way directly, and improves the downlink frequency spectrum efficiency.

PREFERRED EMBODIMENTS OF THE INVENTION

The embodiments of the present document will be described in detail in combination with the accompanying drawings below. It should be illustrated that without a conflict, the embodiments in the present application and the features in the embodiments can be combined with each other randomly.

Figure 1:
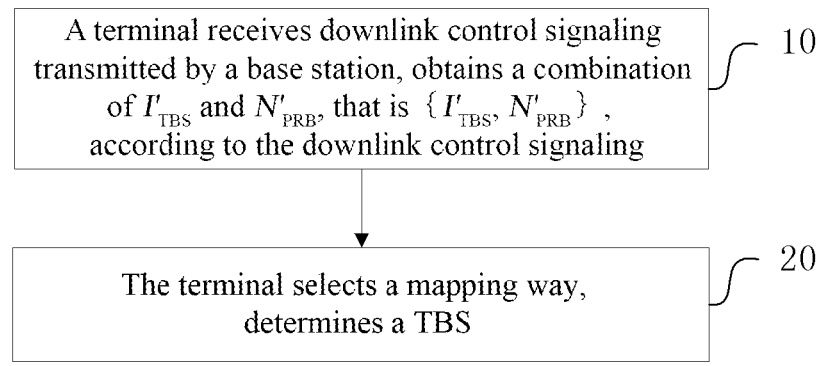
FIG. 1 is a schematic diagram of a method for determining a transport block size applied to a terminal according to the embodiment of the present document.

The embodiment of the present document provides a method for determining a transport block size, and as shown in FIG. 1, which comprises that:

In step 10, a terminal receives downlink control signaling transmitted by a base station, and obtains a combination of $I'_{TBS}$ and $N'_{PRB}$, which is $\{I'_{TBS}, N'_{PRB}\}$, according to the downlink control signaling;

In step 20, the terminal selects a mapping way, determines a transport block size (TBS) according to the $\{I'_{TBS}, N'_{PRB}\}$. Wherein, the mapping way at least comprises one of the following rules:

a first rule: it is to use a high-layer TBS to obtain a low-layer TBS according to the $\{I'_{TBS}, N'_{PRB}\}$;

a second rule: it is to obtain a TBS according to the $\{I'_{TBS}, N'_{PRB}\}$ and a mapping relationship table pre-created;

a third rule: it is to determine a mapping factor according to the $\{I'_{TBS}, N'_{PRB}\}$, obtain $\{I_{TBS}, N_{PRB}\}$ according to the $\{I'_{TBS}, N'_{PRB}\}$ and the mapping factor, and then determine a TBS according to the $\{I_{TBS}, N_{PRB}\}$ and a related $\{I_{TBS}, N_{PRB}\}$ and TBS mapping relationship table, wherein the mapping factor is a real number greater than 0.

In an alternative scheme of the embodiment of the present document, only when a predetermined condition is satisfied, the terminal selects the mapping way, the predetermined condition includes one of the following conditions or combinations of them:

the number of REs which can be used in one resource block is greater than a pre-set value;

or it is a scenario that there is no CRS is transmitted in a sub-frame, and the number of resource elements occupied by DMRSs is 12;

or it is a multi-sub-frame scheduling scenario, i.e., a transport block (TB) is transmitted in a plurality of sub-frames.

Wherein, the pre-set value is 120 or 136 or 168.

In an alternative scheme of the embodiment of the present document, using a high-layer TBS to obtain a low-layer TBS in the first rule can comprise at least one of the following:

it is to use a TBS with L=2 to obtain a TBS with RI=1;

it is to use a TBS with L=3 to obtain a TBS with RI=1 or a TBS with RI=2;

it is to use a TBS with L=4 to obtain a TBS with RI=1 or a TBS with RI=2 or a TBS with RI=3;

wherein, L is the number of high layers, RI is the number of low layers.

In an alternative scheme of the embodiment of the present document, using a high-layer TBS to obtain a low-layer TBS in the first rule can comprise that: it is to determine a mapping factor according to $\{I'_{TBS}, N'_{PRB}\}$, obtain $\{I_{TBS}, N_{PRB}\}$ according to the $\{I'_{TBS}, N'_{PRB}\}$ and the mapping factor, obtain a TBS according to the $\{I_{TBS}, N_{PRB}\}$ and a related high-layer TBS determining way, and take the obtained TBS as the low-layer TBS.

In an alternative scheme of the embodiment of the present document, the second rule can comprise one of the following ways:

it is to create a first mapping relationship table from $\{I'_{TBS}, N'_{PRB}\}$ to a TBS, i.e., it is to create a mapping relationship from $\{I'_{TBS}, N'_{PRB}\}$ to a TBS. It is to look up the first mapping relationship table according to the $\{I'_{TBS}, N'_{PRB}\}$ to obtain the TBS;

or, it is to create a second mapping relationship table from temporary TBS to required TBS. It is to obtain the temporary TBS according to the $\{I'_{TBS}, N'_{PRB}\}$ and the related TBS determining way, and look up the second mapping table according to the temporary TBS to obtain the TBS.

In an alternative scheme of the embodiment of the present document, in the first rule and third rule, it is to use the following mapping formulas to obtain $\{I_{TBS}, N_{PRB}\}$ through the $\{I'_{TBS}, N'_{PRB}\}$ and mapping factor:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

The above formulas describe the mapping formulas required by using the L-layer TBS to obtain the RI-layer TBS. Wherein, L≥RI, the mapping factor F is a real number greater than 0, $\lfloor \ \rfloor$ represents rounding down, $\lceil \ \rceil$ represents rounding up, round represents taking a nearest integer. For the first rule, L>RI; for the third rule, L=RI.

In an alternative scheme of the embodiment of the present document, in the first rule or third rule, the mapping factor is obtained in the following way: it is to divide the $\{I'_{TBS}, N'_{PRB}\}$ into n subsets, and each subset corresponds one mapping factor, the mapping factor is a real number greater than 0, n≥1. Preferably, the mapping factor may be a rational number ranging from 1.1 to 1.4, or, can be selected from positive real numbers, the mapping factor can be in a form of a decimal or fraction.

In an alternative scheme of the embodiment of the present document, determining the mapping factor according to the subsets dividing by the $\{I'_{TBS}, N'_{PRB}\}$ includes, but is not limited to at least one of the following situations:

for n=4, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2; when $A5 \leq N'_{PRB} \leq A6$ and/or $B5 \leq I'_{TBS} \leq B6$, the mapping factor is F3; when $A7 \leq N'_{PRB} \leq A8$ and/or $B7 \leq I'_{TBS} \leq B8$, the mapping factor is F4;

for n=3, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2; when $A5 \leq N'_{PRB} \leq A6$ and/or $B5 \leq I'_{TBS} \leq B6$, the mapping factor is F3;

for n=2, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2.

The above Ai and Bi satisfy Ai≥1; Bi≥1, i=1, 2, 3, . . . , 8.

In an alternative scheme of the embodiment of the present document, said selecting the mapping way comprises selecting one of the rules, selecting one of the rules for all the $\{I'_{TBS}, N'_{PRB}\}$; or selecting the mapping way according to the $\{I'_{TBS}, N'_{PRB}\}$.

In an alternative scheme of the embodiment of the present document, selecting the mapping way according to the $\{I'_{TBS}, N'_{PRB}\}$ comprises, for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the third rule, wherein, the Ci and Di satisfy Ci≥1; Di≥1, i=1, 2, 3, 4.

In an alternative scheme of the embodiment of the present document, selecting the mapping way according to the $\{I'_{TBS}, N'_{PRB}\}$ comprises, for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the second rule.

In an alternative scheme of the embodiment of the present document, selecting the mapping way according to the $\{I'_{TBS}, N'_{PRB}\}$ comprises, for $C1 \leq N'_{PRB} \leq C2$ and/or $D1 \leq I'_{TBS} \leq D2$, selecting the first rule; for $C5 \leq N'_{PRB} \leq C6$ and/or $D5 \leq I'_{TBS} \leq D6$, selecting the third rule; for $C7 \leq N'_{PRB} \leq C8$ and/or $D7 \leq I'_{TBS} \leq D8$, selecting the second rule, wherein, the Ci and Di satisfy Ci≥1; Di≥1, i=1, 2, 3, 4, 5, 6, 7, 8.

In an alternative scheme of the embodiment of the present document, selecting the mapping way according to the $\{I'_{TBS}, N'_{PRB}\}$ comprises, for $C1 \leq N'_{PRB} \leq C2$ and/or $D1 \leq I'_{TBS} \leq D2$, selecting the third rule; for $C3 \leq N'_{PRB} \leq C4$ and/or $D3 \leq I'_{TBS} \leq D4$, selecting the second rule.

Wherein, it is to select the rule according to the $\{I'_{TBS}, N'_{PRB}\}$, when there is no CRS transmitted in a sub-frame, and the number of resource elements occupied by DMRSs is 12:

for $C1 \leq N'_{PRB} \leq C2$ and/or $D1 \leq I'_{TBS} \leq D2$, it is to select the first rule; for $C3 \leq N'_{PRB} \leq C4$ and/or $D3 \leq I'_{TBS} \leq D4$, and for $C3 \leq N'_{PRB} \leq C4$ and/or $D3 \leq I'_{TBS} \leq D4$, it is to select the third rule;

or, for $C1 \leq N'_{PRB} \leq C2$ and/or $D1 \leq I'_{TBS} \leq D2$, it is to select the first rule; for $C3 \leq N'_{PRB} \leq C4$ and/or $D3 \leq I'_{TBS} \leq D4$, it is to select the second rule;

or, for $C1 \leq N'_{PRB} \leq C2$ and/or $D1 \leq I'_{TBS} \leq D2$, it is to select the first rule; for $C5 \leq N'_{PRB} \leq C6$ and/or $D5 \leq I_{TBS} \leq D6$, it is to select the third rule; for $C7 \leq N'_{PRB} \leq C8$ and/or $D7 \leq I'_{TBS} \leq D8$, it is to select the second rule;

wherein, the Ci and Di satisfy $Ci \geq 1$; $Di \geq 1$, i=1, 2, 3, 4, 5, 6, 7, 8.

In an alternative scheme, when multi-sub-frame scheduling is adopted, that is, one transport block is transmitted in h sub-frames, it is to select the first rule, and use the L-layer TBS (L=RI·h) to obtain the RI-layer TBS, wherein, the h is greater than or equals to 1.

In an alternative scheme, when multi-sub-frame scheduling is adopted, i.e., one transport block is transmitted in h sub-frames, when h<Y, or h≥Y, and $N'_{PRB} \leq X1$, it is to select the first rule, and use the L-layer TBS (L=RI·h) to obtain the RI-layer TBS, wherein, the h is greater than or equal to 1;

when h≥Y and the $N'_{PRB} \geq X2$, it is to select the second rule.

The X 1≥1, X2≥1, Y≥1.

Embodiment 1

In the embodiment of the present document, assuming that a scenario is multi-sub-frame scheduling, one-layer transmission, and a transport block (TB) is transmitted in two sub-frames.

The embodiment of the present document provides a method for determining a transport block size in a sub-frame, the method is applied to the terminal, which comprises that:

In step S101, a terminal receives downlink control signaling DCI transmitted by a base station, and obtains a combination of $I'_{TBS}$ and $N'_{PRB}$, which is $\{I'_{TBS}, N'_{PRB}\}$, according to the downlink control signaling;

In step S102, the terminal selects a mapping way according to the current scenario to determine the TBS. Wherein, in the embodiment, the selected mapping way comprises a first rule.

Wherein, in the step S102, determining the TBS according to the first rule comprises that:

1) it is to determine a mapping factor according to the $\{I'_{TBS}, N'_{PRB}\}$ and obtain $\{I_{TBS}, N_{PRB}\}$ according to the $\{I'_{TBS}, N'_{PRB}\}$ and the mapping factor. For reconstructing the RI-layer TBS with the L-layer TBS, mapping formulas between the $\{I_{TBS}, N_{PRB}\}$ and the $\{I'_{TBS}, N'_{PRB}\}$ are:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right).$$

Wherein, RI=1, L=2, and the mapping factor F can be 2; round represents taking the nearest integer.

2) it is to determine the TBS according to the determined $\{I_{TBS}, N_{PRB}\}$ and the related TBS mapping relationship table.

It is to use the way for determining the two-layer TBS in the LTE protocol 36.213, for $1 \leq N_{PRB} \leq 55$, the TBS is given by one-layer TBS table, that is, the element $(I_{TBS}, N_{PRB})$ in table 1; for $55 \leq N_{PRB} \leq 110$, one-layer TBS table is first obtained, that is, the element $(I_{TBS}, N_{PRB})$ in table 1 is taken as the one-layer TBS (TBS_L1), and then the one-layer to two-layer TBS mapping table, that is table 2, is looked up to obtain the two-layer TBS (TBS_L2). The TBS_L2 is the two-layer TBS for reconstructing the one-layer TBS.

Embodiment 2

In the embodiment of the present document, assuming that a scenario is multi-sub-frame scheduling, two-layer transmission, and a TB is transmitted in two sub-frames. The embodiment of the present document provides a method for determining a transport block size in a sub-frame, the method is applied to the terminal, which comprises that:

In step S201, a terminal receives downlink control signaling DCI transmitted by a base station, and obtains a combination of $I'_{TBS}$ and $N'_{PRB}$, which is $\{I'_{TBS}, N'_{PRB}\}$, according to the downlink control signaling;

In step S202, the terminal selects a mapping way according to the current scenario to determine a TBS. Wherein, in the embodiment, the selected mapping way comprises a first rule.

Wherein, in the step S202, determining the TBS according to the first rule comprises that:

1) it is to determine a mapping factor according to $\{I'_{TBS}, N'_{PRB}\}$ and obtain $\{I'_{TBS}, N'_{PRB}\}$ according to the $\{I'_{TBS}, N'_{PRB}\}$ and the mapping factor. For reconstructing the RI-layer TBS with the L-layer TBS, mapping formulas between the $\{I_{TBS}, N_{PRB}\}$ and the $\{I'_{TBS}, N'_{PRB}\}$ are:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right).$$

Wherein, RI=2, L=4, and the mapping the value of the factor F can be 2; round represents taking the nearest integer.

2) it is to determine the TBS according to the determined $\{I'_{TBS}, N_{PRB}\}$ and the related TBS mapping relationship table.

It is to use the way for determining the four-layer TBS in the LTE protocol 36.213, for $1 \leq N_{PRB} \leq 27$, the TBS is given by one-layer TBS table, that is, the element $(I_{TBS}, 4 \cdot N_{PRB})$ in table 1; for $28 \leq N'_{PRB} \leq 110$, one-layer TBS table is first obtained, that is, the element $(I_{TBS}, N_{PRB})$ in table 1 is taken as the one-layer TBS (TBS_L1), and then the one-layer to four-layer TBS mapping table is looked up to obtain the four-layer TBS (TBS_L4). The TBS_L4 is taken as the four-layer TBS for reconstructing the two-layer TBS.

Embodiment 3

In the embodiment of the present document, assuming that it is a NCT scenario, in which one-layer transmission is used, and the number of REs in one RB which can be used to carry data is 156. The embodiment of the present document provides a method for determining a transport block size in a sub-frame, the method is applied to the terminal, which comprises that:

In step S301, a terminal receives downlink control signaling DCI transmitted by a base station, and obtains a combination of $\{I'_{TBS}$ and $N'_{PRB}\}$, which is $\{I'_{TBS}, N'_{PRB}\}$, according to the downlink control signaling;

In step S302, the terminal selects a mapping way according to the current scenario to determine a TBS. Wherein, in the embodiment, the selected mapping way comprises a second rule.

In the step 302, the second rule is achieved according to at least one of the following ways.

Way one: it is to create a new TBS mapping relation table from $\{I'_{TBS}, N'_{PRB}\}$ to a TBS, directly obtain the required TBS according to the $\{I'_{TBS}, N'_{PRB}\}$ and the new TBS mapping relation table. Table 3 is an example, in table 3, it only gives part of mapping relationships from the $\{I'_{TBS}, N'_{PRB}\}$ to the TBS, the element $(I'_{TBS}, N'_{PRB})$ in the table is the required TBS.

TABLE 3

Partial new TBS table under the condition of the
NCT scenario and one-layer spatial multiplexing

| | $N'_{PRB}$ | | | | | | | | |
|---|---|---|---|---|---|---|---|---|---|
| $I'_{TBS}$ | 1 | 2 | 3 | 4 | 5 | 6 | 7 | 8 | 9 |
| 24 | 776 | 1544 | 2344 | 3112 | 4008 | 4776 | 5544 | 6200 | 7224 |
| 25 | 808 | 1608 | 2472 | 3240 | 4136 | 4968 | 5736 | 6456 | 7480 |
| 26 | 840 | 1672 | 2536 | 3368 | 4264 | 5160 | 5992 | 6712 | 7736 |

Way two: it is to create a mapping relationship table from the TBS in the related TBS table to the required TBS in the LTE protocol 36.213. Table 4 is an example, table 4 only gives part of the mapping relationship table. Wherein, the TBS_1 include all distinct TBSs which satisfy $N_{PRB} < 10$ and $I_{TBS} \geq 24$ in table 1. It is to obtain the temporary TBS firstly according to the $\{I'_{TBS}, N'_{PRB}\}$ and the related one-layer TBS table, that is, table 1, then take the temporary TBS as the TBS_1, look up table 4 to obtain the required TBS, that is the TBS_2.

TABLE 4

Related TBS to new TBS mapping table under the condition of the
NCT scenario and one-layer spatial multiplexing

| TBS_1 | TBS_2 |
|---|---|
| 584 | 776 |
| 616 | 808 |
| 712 | 840 |
| 1192 | 1544 |

TABLE 4-continued

Related TBS to new TBS mapping table under the condition of the
NCT scenario and one-layer spatial multiplexing

| TBS_1 | TBS_2 |
|---|---|
| 1256 | 1608 |
| 1480 | 1672 |
| 1800 | 2344 |
| 1864 | 2472 |
| 2216 | 2536 |
| 2408 | 3112 |
| 2536 | 3240 |
| 2984 | 3368 |
| 3112 | 4136 |
| 3624 | 4776 |
| 3752 | 4968 |
| 4264 | 5544 |
| 4392 | 5736 |
| 4968 | 6200 |
| 5160 | 6456 |
| 5544 | 7224 |
| 5736 | 7480 |
| 5992 | 7992 |
| 6712 | 8760 |
| — | — |

Embodiment 4

In the embodiment of the present document, assuming that it is a NCT scenario, in which one-layer transmission is adopted, and the number of REs in one RB which can be used to carry data is 156. The embodiment of the present document provides a method for determining a transport block size in a sub-frame, the method is applied to the terminal, which comprises that:

In step S401, a terminal receives downlink control signaling DCI transmitted by a base station, and obtains a combination of $I'_{TBS}$ and $N'_{PRB}$, which is $\{I'_{TBS}, N'_{PRB}\}$, according to the downlink control signaling;

In step S402, the terminal selects a mapping way according to the current scenario to determine a TBS. Wherein, in the embodiment, the selected mapping way comprises a third rule.

In the step 402, determining the TBS based on the third rule comprises that:

1) it is to determine a mapping factor according to the $\{I_{TBS}, N'_{PRB}\}$;

in the embodiment, it is to divide the $\{I'_{TBS}, N'_{PRB}\}$ into 4 subsets, and each subset corresponds to one mapping factor:

when $1 \leq N'_{PRB} \leq 10$ and $1 \leq I'_{TBS} \leq 25$, F=1.33 or 1.31 or 13/10;

when $11 \leq N'_{PRB} \leq 110$ and $1 \leq I_{TBS} \leq 25$, F=1.30 or 1.31 or 4/3;

when $1 \leq N'_{PRB} \leq 10$ and $I'_{TBS} = 26$, F=1.19 or 1.31 or 1.17;

when $11 \leq N'_{PRB} \leq 110$ and $I'_{TBS} = 26$, F=1.17 or 1.16 or 1.15.

2) It is to obtain $\{I_{TBS}, N_{PRB}\}$ according to the $\{I'_{TBS}, N'_{PRB}\}$ and the mapping factor; in the embodiment, mapping formulas between the $\{I_{TBS}, N_{PRB}\}$ and $\{I'_{TBS}, N'_{PRB}\}$ are:

$$I_{TBS} = I'_{TBS}, N_{PRB} = \min(\lfloor N'_{PRB} \times F \rfloor, 110);$$

or, $I_{TBS} = I'_{TBS}, N_{PRB} = \min(\lceil N'_{PRB} \times F \rceil, 110);$ or, $I_{TBS} = I'_{TBS}, N_{PRB} = \min(\text{round}(N'_{PRB} \times F), 110).$ 3) It is to look up the related one-layer TBS mapping relationship table, that is, the elements ($I_{TBS}$, $N_{PRB}$) in table 1, according to the $\{I_{TBS}, N'_{PRB}\}$ to obtain the TBS.

Embodiment 5

In the embodiment, assuming that it is a NCT scenario, in which one-layer transmission is adopted, and the number of REs in one RB which can be used to carry data is 156. The embodiment of the present document provides a method for determining a transport block size in a sub-frame, the method is applied to the terminal, which comprises that:

In step S501, a terminal receives downlink control signaling DCI transmitted by a base station, and obtains a combination of $I'_{TBS}$ and $N'_{PRB}$, which is $\{I'_{TBS}, N'_{PRB}\}$, according to the downlink control signaling;

In step S502, the terminal selects a mapping way according to the current scenario to determine a TBS. Wherein, in the embodiment, the selected mapping way comprises a first rule and a third rule.

Wherein, in the step S402, when $85 \leq N'_{PRB} \leq 110$ and $1 \leq I'_{TBS} \leq 26$, it is to use the first rule; it is to determine a mapping facto according to the $\{I'_{TBS}, N'_{PRB}\}$, obtain $\{I_{TBS}, N_{PRB}\}$ according to the $\{I'_{TBS}, N'_{PRB}\}$ and the mapping factor, then to determine the TBS according to the $\{I_{TBS}, N_{PRB}\}$ and the related TBS mapping relationship table; when $1 \leq N'_{PRB} \leq 84$ and $1 \leq I'_{TBS} \leq 26$, it is to use the third rule.

Wherein, in the step 502, it comprises that:

1) it is to obtain $\{I_{TBS}, N'_{PRB}\}$ according to the $\{I'_{TBS}, N'_{PRB}\}$ and the mapping factor, mapping formulas between the $\{I_{TBS}, N_{PRB}\}$ and $\{I'_{TBS}, N'_{PRB}\}$ are:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

The first formula is used in the embodiment, that is, $$I_{TBS} = I'_{TBS}, N_{PRB} = \min\left(\left\lfloor \frac{N'_{PRB} \times F \times RI}{L} \right\rfloor, 110\right).$$

The selection of the RI, L and the mapping factor F is as follows:

for the first rule, RI=1, L=2, when $85 \leq N'_{PRB} \leq 110$ and $1 \leq I'_{TBS} \leq 25$, F=1.31 or 1.30; when $85 \leq N'_{PRB} \leq 110$ and $I'_{TBS} = 26$, F=1.17 or 1.16;

for the third rule, RI=1, L=1.

The mapping factor is determined according the following ways.

it is to divide the $\{I'_{TBS}, N'_{PRB}\}$ into 4 subsets, and each subset corresponds to one mapping factor:

when $1 \leq N'_{PRB} \leq 10$ and $1 \leq I'_{TBS} \leq 25$, F=1.33 or 1.31 or 13/10;

when $11 \leq N'_{PRB} \leq 84$ and $1 \leq I'_{TBS} \leq 25$, F=1.30 or 1.31 or 4/3;

when $1 \leq N'_{PRB} \leq 10$ and $I'_{TBS} = 26$, F=1.19 or 1.31 or 1.17;

when $11 \leq N'_{PRB} \leq 84$ and $I'_{TBS} = 26$, F=1.17 or 1.16 or 1.15.

2) After the $\{I_{TBS}, N_{PRB}\}$ is determined, it is to determine the TBS according to the $\{I_{TBS}, N'_{PRB}\}$ and the TBS table:

when $85 \leq N'_{PRB} \leq 110$ and $1 \leq I'_{TBS} \leq 26$, it is to use the first rule. It is to use the way for determining the two-layer TBS in the LTE protocol 36.213, for $1 \leq N_{PRB} \leq 55$, the TBS is given by the one-layer TBS table, that is, the element ($I_{TBS}$, $2 \cdot N_{PRB}$) in table 1; for $55 \leq N'_{PRB} \leq 110$, one-layer TBS table is first obtained, that is, the element ($I_{TBS}$, $N_{PRB}$) in table 1 is taken as the one-layer TBS (TBS_L1), and then the one-layer to two-layer TBS mapping table, that is, table 2, is looked up to obtain the two-layer TBS (TBS_L2). The TBS_L2 is the two-layer TBS for reconstructing the one-layer TBS.

When $1 \leq N'_{PRB} \leq 84$ and $1 \leq I'_{TBS} \leq 26$, it is to use the third rule, and look up the related one-layer TBS table according to the $\{I_{TBS}, N_{PRB}\}$, that is the element $\{I_{TBS}, N_{PRB}\}$ in table 1 can be taken as the ultimate TBS.

Embodiment 6

In the embodiment, assuming that it is a NCT scenario, in which one-layer transmission is adopted, and the number of REs in one RB which can be used to carry data is 156. The embodiment of the present document provides a method for determining a transport block size in a sub-frame, the method is applied to the terminal, which comprises that:

In step S601, a terminal receives downlink control signaling DCI transmitted by a base station, and obtains a combination of $I'_{TBS}$ and $N'_{PRB}$, which is $\{I'_{TBS}, N'_{PRB}\}$, according to the downlink control signaling;

In step S602, the terminal selects a mapping way according to the current scenario to determine a TBS. Wherein, in the embodiment, the selected mapping way comprises a first rule and a second rule.

Preferably, when $10 \leq N'_{PRB} \leq 110$ and $1 \leq I'_{TBS} \leq 26$, it is to use the first rule, obtain $\{I_{TBS}, N_{PRB}\}$ according to the $\{I'_{TBS}, N'_{PRB}\}$ and the mapping factor, then determine the TBS according to the $\{I_{TBS}, N_{PRB}\}$ and the related TBS mapping relationship table; when $1 \leq N'_{PRB} \leq 84$ and $1 \leq I'_{TBS} \leq 26$, it is to use the second rule and create a mapping relationship table from a temporary TBS to a required TBS. The temporary TBS is first obtained according to the $\{I'_{TBS}, N'_{PRB}\}$ and the related-layer TBS mapping relationship table, such as table 1, then the required TBS is obtained according to the temporary TBS and the created mapping relationship table from the temporary TBS to the required TBS.

Preferably, when the first rule is used, the mapping formulas between the $\{I_{TBS}, N_{PRB}\}$ and $\{I'_{TBS}, N'_{PRB}\}$ are:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right).$$

Wherein, RI=1, L=2, when $10 \leq N_{PRB} \leq 110$ and $1 \leq I'_{TBS} \leq 25$, there can be F=1.3; when $10 \leq N'_{PRB} \leq 110$ and $I'_{TBS} = 26$, there can be F=1.17.

Preferably, it is to determine the TBS according to the $\{I_{TBS}, N_{PRB}\}$ or $\{I'_{TBS}, N'_{PRB}\}$ and TBS mapping relationship table:

when $10 \leq N'_{PRB} \leq 110$ and $1 \leq I'_{TBS} \leq 26$, it is to use the first rule and the way for determining the two-layer TBS in the LTE protocol 36.213. That is, for $1 \leq N_{PRB} \leq 55$, the TBS is given by the one-layer TBS mapping relationship table, that is, the element ($I_{TBS}$, $2 \cdot N_{PRB}$) in table 1; for $55 \leq N_{PRB} \leq 110$, the one-layer TBS table is first obtained, that is, the element ($I_{TBS}$, $N_{PRB}$) in table 1 is taken as the one-layer TBS (TBS_L1), and then the one-layer to two-layer TBS mapping table, that is, table 2, is looked up to obtain the two-layer TBS (TBS_L2). The TBS_L2 is the two-layer TBS for reconstructing the one-layer TBS;

when $1 \leq N'_{PRB} \leq 9$ and $1 \leq I'_{TBS} \leq 26$, it is to use the second rule. In table 4, it gives the mapping relationship table, the TBS_1 in table 4 includes all distinct TBSs which satisfy $N_{PRB} < 10$ and $I_{TBS} \geq 24$. It is to obtain the temporary TBS firstly according to the $\{I'_{TBS}, N'_{PRB}\}$ and the related one-layer TBS table, that is, table 1, then take the temporary TBS as the TBS_1, look up the table 4 to obtain the required TBS, that is the TBS_2.

Embodiment 7

In the embodiment of the present document, assuming that it is a NCT scenario, in which one-layer transmission is adopted, and the number of REs in one RB which can be used to carry data is 156. The embodiment of the present document provides a method for determining a transport block size in a sub-frame, the method is applied to the terminal, which comprises that:

In step S701, a terminal receives downlink control signaling DCI transmitted by a base station, and obtains a combination of $I'_{TBS}$ and $N'_{PRB}$, which is $\{I'_{TBS}, N'_{PRB}\}$, according to the downlink control signaling;

In step S702, the terminal selects a mapping way according to the current scenario to determine a TBS. Wherein, in the embodiment, the selected mapping way comprises a second rule and a third rule.

Wherein, in the step S702, when $1 \leq N'_{PRB} \leq 5$ and $1 \leq I'_{TBS} \leq 26$, or when $86 \leq N'_{PRB} \leq 110$ and $1 \leq I'_{TBS} \leq 26$, it is to use the second rule. It is to create a mapping relationship table from a temporary TBS to a required TBS. It is to obtain the temporary TBS firstly according to the $\{I'_{TBS}, N'_{PRB}\}$ and related one-layer TBS mapping relationship table, that is, table 1, and then obtain the TBS according to the temporary TBS and the newly-created mapping relationship table from the temporary TBS to the required TBS; and when $6 \leq N'_{PRB} \leq 85$ and $1 \leq I'_{TBS} \leq 26$, it is to use the third rule.

Preferably, in the embodiment, in the third rule, the mapping formulas between the $\{I_{TBS}, N_{PRB}\}$ and $\{I'_{TBS}, N'_{PRB}\}$ are:

$$I_{TBS} = I'_{TBS}, N_{PRB} = \min(\lfloor N'_{PRB} \times F \rfloor, 110):$$

or, $I_{TBS} = I'_{TBS}, N_{PRB} = \min(\lceil N'_{PRB} \times F \rceil, 110);$ or, $I_{TBS} = I'_{TBS}, N_{PRB} = \min(\text{round}(N'_{PRB} \times F), 110).$ Preferably, in the embodiment, in the third rule, it is to divide the $\{I'_{TBS}, N'_{PRB}\}$ into 2 subsets, and each subset corresponds to one mapping factor:

when $6 \leq N'_{PRB} \leq 85$ and $1 \leq I'_{TBS} \leq 25$, there can be F=1.3 or 1.31 or 1.33; when $6 \leq N'_{PRB} \leq 85$ and $I'_{TBS}=26$, there can be F=1.17 or 1.18 or 1.19.

Preferably, it is to determine the TBS according to the $\{I_{TBS}, N_{PRB}\}$ or $\{I'_{TBS}, N'_{PRB}\}$ and the TBS table:

when $6 \leq N'_{PRB} \leq 85$ and $1 \leq I'_{TBS} \leq 26$, it is to use the third first rule. It is to look up the related one-layer TBS mapping relationship table according to the $\{I_{TBS}, N_{PRB}\}$, i.e., the element ($I_{TBS}, N_{PRB}$) is taken as the required TBS.

When $1 \leq N'_{PRB} \leq 5$ and $1 \leq I'_{TBS} \leq 26$, or, when $86 \leq N'_{PRB} \leq 110$ and $1 \leq I'_{TBS} \leq 26$, it is to use the second rule. In table 4, it gives the mapping relationship table, the TBS_1 in table 4 include all distinct TBSs which satisfy $N_{PRB} \leq 8$ and $I_{TBS} \geq 24$ in table 1, owing to space constraints, the mapping relationship table for $86 \leq N'_{PRB} \leq 110, 1 \leq I'_{TBS} \leq 26$ is not given. It is to obtain the temporary TBS firstly according to the $\{I'_{TBS}, N'_{PRB}\}$ and the related one-layer TBS table, that is, table 1, then take the temporary TBS as the TBS_1, look up table 4 to obtain the required TBS, that is the TBS_2.

Embodiment 8

In the embodiment of the present document, assuming that it is a NCT scenario, in which one-layer transmission is used, and the number of REs in one RB which can be used to carry data is 156. The embodiment of the present document provides a method for determining a transport block size in a sub-frame, the method is applied to the terminal, which comprises that:

In step S801, a terminal receives downlink control signaling transmitted by a base station, and obtains a combination of $I'_{TBS}$ and $N'_{PRB}$, which is $\{I'_{TBS}, N'_{PRB}\}$, according to the downlink control signaling;

In step S802, the terminal selects a mapping way according to the current scenario to determine a TBS. Wherein, in the embodiment, the selected mapping way comprises a first rule, a second rule and a third rule.

Preferably, when $1 \leq N'_{PRB} \leq 9$ and $1 \leq I'_{TBS} \leq 26$, it is to use the second rule. It is to create a mapping relationship table from a temporary TBS to a required TBS. The temporary TBS is first obtained according to the $\{I'_{TBS}, N'_{PRB}\}$ and the related one-layer TBS table, such as table 1, then the required TBS is obtained according to the temporary TBS and the created mapping relationship table from the temporary TBS to the required TBS.

when $10 \leq N'_{PRB} \leq 85$ and $1 \leq I'_{TBS} \leq 26$, it is to use the third first rule;

when $86 \leq N'_{PRB} \leq 110$ and $1 \leq I'_{TBS} \leq 26$, it is to use the first rule, obtain the $\{I_{TBS}, N_{PRB}\}$ according to the $\{I'_{TBS}, N'_{PRB}\}$ and the mapping factor, and then determine the TBS according to the $\{I_{TBS}, N_{PRB}\}$ and the related TBS mapping relationship table.

Preferably, in the embodiment, it is to obtain $\{I_{TBS}, N_{PRB}\}$ according to the $\{I'_{TBS}, N'_{PRB}\}$ and the mapping factor, mapping formulas between the $\{I_{TBS}, N_{PRB}\}$ and $\{I'_{TBS}, N'_{PRB}\}$ are:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right).$$

The first formula is used in the embodiment, that is, $$I_{TBS} = I'_{TBS}, N_{PRB} = \min\left(\left\lfloor \frac{N'_{PRB} \times F \times RI}{L} \right\rfloor, 110\right);$$

The selection of the RI, L, and mapping factor F is as follows:

for the first rule, RI=1, L=2, when $86 \leq N'_{PRB} \leq 110$ and $1 \leq I_{TBS} \leq 25$, there can be F=1.3; when $86 \leq N'_{PRB} \leq 110$ and $I'_{TBS}=26$, there can be F=1.17;

for the third rule, RI=1, L=1. Preferably, it is to divide the $\{I'_{TBS}, N'_{PRB}\}$ into 2 subsets, and each subset corresponds to one mapping factor:

when $11 \leq N'_{PRB} \leq 85$ and $1 \leq I'_{TBS} \leq 25$, F=1.30;
when $11 \leq N'_{PRB} \leq 85$ and $1 \leq I'_{TBS} \leq 26$, F=1.17.

Preferably, it is to determine the TBS according to the $\{I_{TBS}, N_{PRB}\}$ or $\{T_{TBS}, N_{PRB}\}$ and the TBS table:

When $86 \leq N'_{PRB} \leq 110$ and $1 \leq I'_{TBS} \leq 26$ it is to use the first rule and use the way for determining the two-layer TBS in the LTE protocol 36.213, that is, for $1 \leq N_{PRB} \leq 55$, the TBS is given by the one-layer TBS table, that is, the element ($I_{TBS}$, $2 \cdot N_{PRB}$) in table 1; for $55 \leq N_{PRB} \leq 110$, the one-layer TBS table is first obtained, that is, the element ($I_{TBS}$, $N_{PRB}$) in table 1 is taken as the one-layer TBS (TBS_L1), and then the one-layer to two-layer TBS mapping table, that is, the table 2, is looked up to obtain the two-layer TBS (TBS_L2). The TBS_L2 is the two-layer TBS for reconstructing the one-layer TBS;

when $10 \leq N'_{PRB} \leq 85$ and $1 \leq I'_{TBS} \leq 26$, it is to use the third first rule. It is to look up the one-layer TBS table according to the $\{I_{TBS}, N_{PRB}\}$, i.e., the element ($I_{TBS}$, $N'_{PRB}$) is taken as the required TBS;

when $1 \leq N'_{PRB} \leq 9$ and $1 \leq I'_{TBS} \leq 26$, it is to use the second rule. In table 4, it gives the mapping relationship table, the TBS_1 in table 4 include all distinct TBSs which satisfy $N_{PRB} < 10$ and $I_{TBS} \geq 24$. It is to obtain the temporary TBS according to the $\{I'_{TBS}, N'_{PRB}\}$ and the related one-layer TBS table, that is, table 1, then take the temporary TBS as the TBS_1, look up the table 4 to obtain the required TBS, that is the TBS_2.

Figure 2:
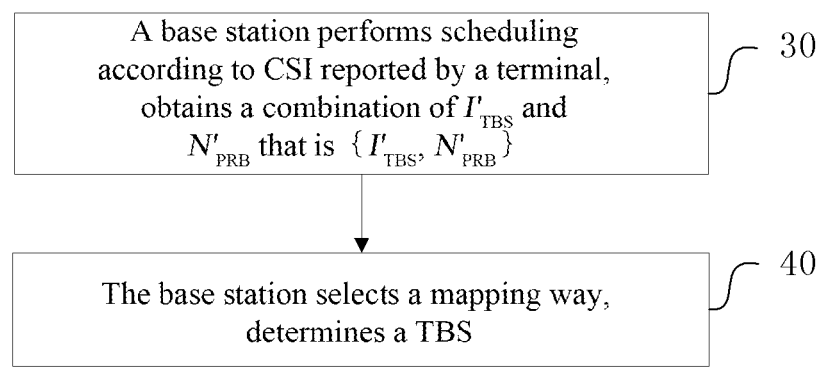
FIG. 2 is a schematic diagram of a method for determining a transport block size applied to a base station according to the embodiment of the present document.

The embodiment of the present document provides a method for determining a transport block size, the method is applied to a base station, as shown in FIG. 2, which comprises that:

In step 30, the base station performs scheduling according to channel state information reported by the terminal, determines a combination of $I'_{TBS}$ and $N'_{PRB}$, which is $\{I'_{TBS}, N'_{PRB}\}$;

In step 40, the base station selects a mapping way, determines a transport block size (TBS) according to the $\{I'_{TBS}, N'_{PRB}\}$, wherein, the mapping way at least comprises one of the following rules:

a first rule: it is to use a high-layer TBS to obtain a low-layer TBS according to the $\{I'_{TBS}, N_{PRB}\}$;

a second rule: it is to obtain a TBS according to the $\{I'_{TBS}, N'_{PRB}\}$ and a mapping relationship table pre-created;

a third rule: it is to determine a mapping factor according to the $\{I'_{TBS}, N'_{PRB}\}$, obtain $\{I_{TBS}, N_{PRB}\}$ according to the $\{I'_{TBS}, N'_{PRB}\}$ and the mapping factor, and then determine a TBS according to the $\{I_{TBS}, N_{PRB}\}$ and a related $\{I_{TBS}, N_{PRB}\}$ and TBS mapping relationship table, wherein the mapping factor is a real number greater than 0.

In an alternative scheme of the embodiment of the present document, only when a predetermined condition is satisfied, the base station selects the mapping way, the predetermined condition includes at least one of the following conditions or combinations of them:

the number of resource elements which can be used in one resource block is greater than a pre-set value;

or it is a scenario that there is no cell-specific reference signal transmitted in a sub-frame, and the number of the resource elements occupied by demodulation reference signals is 12;

or it is a multi-sub-frame scheduling scenario, i.e., a transport block is transmitted in a plurality of sub-frames.

In an alternative scheme of the embodiment of the present document, the pre-set value is 120, 136 or 168.

In an alternative scheme of the embodiment of the present document, said using a high-layer TBS to obtain a low-layer TBS can comprise at least one of the following:

it is to use a TBS with L=2 to obtain a TBS with RI=1;
it is to use a TBS with L=3 to obtain a TBS with RI=1 or a TBS with RI=2;
it is to use a TBS with L=4 to obtain a TBS with RI=1 or a TBS with RI=2 or a TBS with RI=3;

wherein, L is the number of high layers, RI is the number of low layers.

In an alternative scheme of the embodiment of the present document, said using a high-layer TBS to obtain a low-layer TBS comprises that:

it is to determine a mapping factor according to the $\{I_{TBS}, N'_{PRB}\}$, obtain $\{I_{TBS}, N'_{PRB}\}$ according to the $\{I'_{TBS}, N'_{PRB}\}$ and the mapping factor, take TBS obtained according to the $\{I_{TBS}, N_{PRB}\}$ and a related high-layer TBS determining way as the low-layer TBS.

In an alternative scheme of the embodiment of the present document, the mapping relationship table in the second rule is a first mapping relationship table from $\{I'_{TBS}, N'_{PRB}n\}$ to a TBS; said obtaining a TBS according to the $\{I'_{TBS}, N'_{PRB}\}$ and a mapping relationship table pre-created comprises that:

it is to look up the first mapping relationship table according to the $\{I'_{TBS}, N'_{PRB}\}$ to obtain the TBS;

or, the mapping relationship table in the second rule is a second mapping relationship table from a temporary TBS to a required TBS; said obtaining a TBS according to the $\{I'_{TBS}, N'_{PRB}\}$ and a mapping relationship table pre-created comprises that: it is to obtain the temporary TBS according to $\{I'_{TBS}, N'_{PRB}\}$ and a related TBS determining way, and look up the second mapping relationship table according to the temporary TBS to obtain the TBS.

In an alternative scheme of the embodiment of the present document, obtaining the $\{I_{TBS}, N_{PRB}\}$ according to the $\{I'_{TBS}, N'_{PRB}\}$ and mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the $L \geq RI$, the F is a mapping factor, the F is a real number greater than 0, round represents that obtaining a nearest integer, in the first rule, the L, RI represent that an RI-layer TBS is obtained according to an L-layer TBS, and L>RI; in the third rule, L=RI.

In an alternative scheme of the embodiment of the present document, determining the mapping factor according to the $\{I'_{TBS}, N'_{PRB}\}$ comprises that:

it is to divide the $\{I'_{TBS}, N'_{PRB}\}$ into n subsets, each subset corresponds to one mapping factor, wherein, the n is greater than or equals to 1.

In an alternative scheme of the embodiment of the present document, said dividing the $\{I'_{TBS}, N'_{PRB}\}$ into n subsets, each subset corresponding to one mapping factor, at least comprises one of the following:

n=4, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2; when $A5 \leq N_{PRB} \leq A6$ and/or $B5 \leq I'_{TBS} \leq B6$, the mapping factor is F3; when $A7 \leq N'_{PRB} \leq A8$ and/or $B7 \leq I'_{TBS} \leq B8$, the mapping factor is F4;

n=3, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2; when $A5 \leq N'_{PRB} \leq A6$ and/or $B5 \leq I'_{TBS} \leq B6$, the mapping factor is F3;

n=2, when $A1 \leq N'_{PRB} \leq A2$ and/or $B1 \leq I'_{TBS} \leq B2$, the mapping factor is F1; when $A3 \leq N'_{PRB} \leq A4$ and/or $B3 \leq I'_{TBS} \leq B4$, the mapping factor is F2;

The above Ai and Bi satisfy $Ai \geq 1$; $Bi \geq 1$, i=1, 2, 3, . . . , 8.

In an alternative scheme of the embodiment of the present document, the base station selecting a mapping way comprises that:

the base station selects one of the first rule, second rule and third rule for all the $\{I'_{TBS}, N'_{PRB}\}$;

or, the base station selects the mapping way according to the $\{I'_{TBS}, N'_{PRB}\}$.

In an alternative scheme of the embodiment of the present document, the base station selecting the mapping way according to the $\{I'_{TBS}, N'_{PRB}\}$ comprises that:

for $C1 \leq N'_{PRB} \leq C2$ and/or $D1 \leq I'_{TBS} \leq D2$, it is to select the first rule; for $C3 \leq N'_{PRB} \leq C4$ and/or $D3 \leq I'_{TBS} \leq D4$, it is to select the third rule, wherein the Ci and Di satisfy $Ci \geq 1$; $Di \geq 1$, i=1, 2, 3, 4.

In an alternative scheme of the embodiment of the present document, the base station selecting the mapping way according to the $\{I'_{TBS}, N'_{PRB}\}$ comprises that:

for $C1 \leq N'_{PRB} \leq C2$ and/or $D1 \leq I'_{TBS} \leq D2$, it is to select the first rule; for $C3 \leq N'_{PRB} \leq C4$ and/or $D3 \leq I'_{TBS} \leq D4$, it is to select the second rule, wherein the Ci and Di satisfy $Ci \geq 1$; $Di \geq 1$, i=1, 2, 3, 4.

In an alternative scheme of the embodiment of the present document, the base station selecting the mapping way according to the $\{I'_{TBS}, N'_{PRB}\}$ comprises that:

for $C1 \leq N'_{PRB} \leq C2$ and/or $D1 \leq I'_{TBS} \leq D2$, it is to select the first rule; for $C5 \leq N'_{PRB} \leq C6$ and/or $D5 \leq I'_{TBS} \leq D6$, it is to select the third rule; for $C7 \leq N'_{PRB} \leq C8$ and/or $D7 \leq I'_{TBS} \leq D8$, it is to select the second rule, wherein the Ci and Di satisfy $Ci \geq 1$; $Di \geq 1$, i=1, 2, 3, 4, 5, 6, 7, 8.

In an alternative scheme of the embodiment of the present document, the base station selecting the mapping way according to the $\{I'_{TBS}, N'_{PRB}\}$ comprises that:

for $C1 \leq N'_{PRB} \leq C2$ and/or $D1 \leq I'_{TBS} \leq D2$, it is to select the third rule; for $C3 \leq N'_{PRB} \leq C4$ and/or $D3 \leq I'_{TBS} \leq D4$, selecting the second rule, wherein the Ci and Di satisfy $Ci \geq 1$; $Di \geq 1$, i=1, 2, 3, 4.

In an alternative scheme of the embodiment of the present document, the base station selecting the mapping way according to the $\{I'_{TBS}, N'_{PRB}\}$ comprises that:

when there is no CRS transmitted in a sub-frame, and the number of resource elements occupied by DMRSs is 12:

for $C1 \leq N'_{PRB} \leq C2$ and/or $D1 \leq I'_{TBS} \leq D2$, it is to select the first rule; for $C3 \leq N'_{PRB} \leq C4$ and/or $D3 \leq I'_{TBS} \leq D4$, it is to select the third rule;

or, for $C1 \leq N'_{PRB} \leq C2$ and/or $D1 \leq I'_{TBS} \leq D2$, it is to select the first rule; for $C3 \leq N'_{PRB} \leq C4$ and/or $D3 \leq I'_{TBS} \leq D4$, it is to select the second rule;

or, for $C1 \leq N'_{PRB} \leq C2$ and/or $D1 \leq I'_{TBS} \leq D2$, it is to selecting the first rule; for $C5 \leq N'_{PRB} \leq C6$ and/or $D5 \leq I_{TBS} \leq D6$, it is to select the third rule; for $C7 \leq N'_{PRB} \leq C8$ and/or $D7 \leq I'_{TBS} \leq D8$, it is to select the second rule;

wherein, the Ci and Di satisfy $Ci \geq 1$; $Di \geq 1$, i=1, 2, 3, 4, 5, 6, 7, 8.

In an alternative scheme of the embodiment of the present document, the base station selecting a mapping way comprises that:

when multi-sub-frame scheduling is adopted, i.e., one transport block is transmitted in h sub-frames, it is to select the first rule, and use the L-layer TBS (L=RI·h) to obtain the RI-layer TBS wherein, the h is greater than or equal to 1.

In an alternative scheme of the embodiment of the present document, the base station selecting a mapping way comprises that:

when multi-sub-frame scheduling is adopted, i.e., one transport block is transmitted in h sub-frames:

when h<Y, or $h \geq Y$ and the $N'_{PRB} \leq X1$, it is to select the first rule, and using the L-layer TBS (L=RI·h) to obtain the RI-layer TBS, wherein, the h is greater than or equal to 1;

when $h \geq Y$ and the $N'_{PRB} \geq X2$, it is to select the second rule;

wherein, the X $1 \geq 1$, $X2 \geq 1$, $Y \geq 1$.

Figure 3:
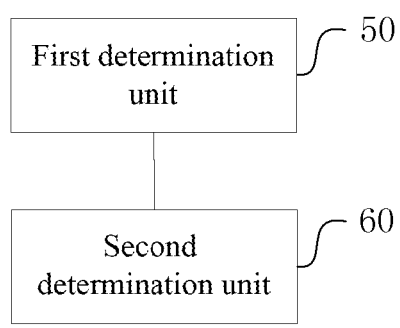
FIG. 3 is a block diagram of a terminal according to the embodiment of the present document.

The embodiment of the present document further provides a terminal, as shown in FIG. 3, comprising that:

a first determination unit 50, configured to receive downlink control signaling transmitted by a base station, and obtain a combination of $I'_{TBS}$ and $N'_{PRB}$, which is $\{I'_{TBS}, N'_{PRB}\}$, according to the downlink control signaling;

a second determination unit 60, configured to select a mapping way, determine a transport block size (TBS) according to the $\{I'_{TBS}, N'_{PRB}\}$, wherein, the mapping way at least comprises one of the following rules:

a first rule: it is to use a high-layer TBS to obtain a low-layer TBS according to the $\{I'_{TBS}, N'_{PRB}\}$;

a second rule: it is to obtain a TBS according to the $\{I'_{TBS}, N'_{PRB}\}$ and a mapping relationship table pre-created;

a third rule: it is to determine a mapping factor according to the $\{I'_{TBS}, N'_{PRB}\}$, obtain $\{I_{TBS}, N'_{PRB}\}$ according to the $\{I'_{TBS}, N'_{PRB}\}$ and the mapping factor, and then determine a TBS according to the $\{I_{TBS}, N'_{PRB}\}$ and a related $\{I_{TBS}, N'_{PRB}\}$ and TBS mapping relationship table, wherein the mapping factor is a real number greater than 0.

How the second determination unit 60 selects the mapping way, and the implementation of various mapping ways are referred to the method embodiment of the terminal side, which will not be described repeatedly here.

Figure 4:
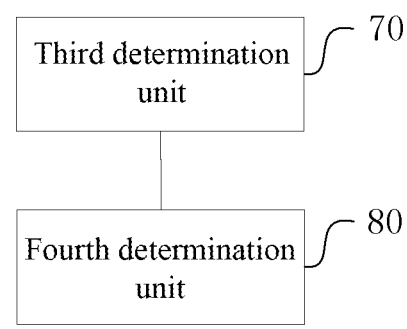
FIG. 4 is a block diagram of a base station in accordance with an embodiment of the present document.

The embodiment of the present document further provides a base station, and as shown in FIG. 4, comprising that:

a third determination unit 70, configured to perform scheduling according to channel state information reported by a terminal, determine a combination of $I'_{TBS}$ and $N'_{PRB}$, which is $I'_{TBS}, N'_{PRB}\}$;

a fourth determination unit 80, configured to select a mapping way, determine a transport block size (TBS) according to the $\{I'_{TBS}, N'_{PRB}\}$, wherein, the mapping way at least comprises one of the following rules:

a first rule: it is to use a high-layer TBS to obtain a low-layer TBS according to the $\{I'_{TBS}, N'_{PRB}\}$;

a second rule: it is to obtain a TBS according to the $\{I'_{TBS}, N'_{PRB}\}$ and a mapping relationship table pre-created;

a third rule: it is to determine a mapping factor according to the $\{I'_{TBS}, N'_{PRB}\}$, obtain $\{I_{TBS}, N_{PRB}\}$ according to the $\{I'_{TBS}, N'_{PRB}\}$ and the mapping factor, and then determine a TBS according to the $\{I_{TBS}, N'_{PRB}\}$ and a related $\{I_{TBS}, N'_{PRB}\}$ and TBS mapping relationship table, wherein the mapping factor is a real number greater than 0.

How the fourth determination unit 80 selects the mapping way, and the implementation of various mapping ways are referred to the method embodiment of the base station side, which will not be described repeatedly here.

The above embodiments relate to the method for determining the TBS for one-layer transmission or two-layer transmission, but are not limited to the situations of one-layer and two-layer; for the more-layer transmission, the method of the present document can be applied as well, the embodiments will not be given any more here.

The method for determining the transport block size in a sub-frame provided by the embodiment of the present document applies to the terminal and base station, it provides the corresponding TBS mapping way when the number of the REs which can be used in one RB is changed, and solves the problem of the reduced actual code rate which results from using the related TBS determining way directly, and improves the downlink frequency spectrum efficiency.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Accordingly, each module/unit in the above embodiments can be implemented in a form of hardware, or can also be implemented in a form of software functional module. The embodiments of the present document are not limited to any particular form of a combination of hardware and software.

INDUSTRIAL APPLICABILITY

The method for determining the transport block size provided by the embodiment of the present document applies to the terminal and base station, it provides the corresponding TBS mapping way when the number of the REs which can be used in one RB is changed, and solves the problem of the reduced actual code rate which results from using the related TBS determining way directly, and improves the downlink frequency spectrum efficiency.

What is claimed is:

1. A method for determining a transport block size, comprising:
  a terminal receiving downlink control signaling transmitted by a base station, and obtaining a combination of $I'_{TBS}$ and $N'_{PRB}$, which is $\{I'_{TBS}, N'_{PRB}\}$, according to the downlink control signaling;
  the terminal selecting a mapping way, determining a transport block size (TBS) according to the $\{I'_{TBS}, N'_{PRB}\}$, wherein, the mapping way comprises the following rule:
  a first rule: using a high-layer TBS to obtain a low-layer TBS according to the $\{I'_{TBS}, N'_{PRB}\}$;
  the terminal decoding a downlink data according to the TBS; wherein, said using a high-layer TBS to obtain a low-layer TBS comprises:
  determining a mapping factor according to the $\{I'_{TBS}, N_{PRB}\}$, obtaining $\{I_{TBS}, N_{PRB}\}$ according to the $\{I'_{TBS}, N'_{PRB}\}$ and the mapping factor, determining a TBS obtained according to the $\{I_{TBS}, N_{PRB}\}$ and a related TBS mapping relationship table as the low-layer TBS; wherein, said obtaining $\{I_{TBS}, N_{PRB}\}$ according to the $\{I'_{TBS}, N'_{PRB}\}$ and the mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the L≥RI, the F is a mapping factor, the F is a real number greater than 0, round represents taking a nearest integer, and in the first rule, the L, RI represent that an RI-layer TBS is obtained according to an L-layer TBS, and L>RI; in the third rule, L=RI.

2. The method of claim 1, wherein, the method further comprises only when a predetermined condition is satisfied, the terminal selecting the mapping way, the predetermined condition includes at least one of the following conditions:
  a number of resource elements which can be used in one resource block is greater than a pre-set value;
  or it is a scenario that there is no cell-specific reference signal transmitted in a sub-frame, and a number of the resource elements occupied by demodulation reference signals is 12;
  or it is a multi-sub-frame scheduling scenario, i.e., a transport block is transmitted in a plurality of sub-frames.

3. The method of claim 2, wherein, the pre-set value is 120, 136, 168.

4. The method according to claim 1, wherein, said using a high-layer TBS to obtain a low-layer TBS at least comprises one of the following:
  using a TBS with L=2 to obtain a TBS with RI=1;
  using a TBS with L=3 to obtain a TBS with RI=1 or a TBS with RI=2;
  using a TBS with L=4 to obtain a TBS with RI=1 or a TBS with RI=2 or a TBS with RI=3;
  wherein, L is a number of high layers, RI is a number of low layers.

5. The method of claim 1, wherein, the terminal selecting a mapping way further comprises:
  the terminal selecting one of the first rule, and a third rule for all the $\{I'_{TBS}, N'_{PRB}\}$ wherein the third rule is: determining the mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, and then determining a TBS according to the $\{I_{TBS}, N_{PRB}\}$ and a related one-layer TBS mapping relationship table, wherein the mapping factor is a real number greater than 0,
  or, the terminal selecting the mapping way according to the $\{I'_{TBS}, N'_{PRB}\}$.

6. The method of claim 1, wherein, said determining a mapping factor according to the $\{I'_{TBS}, N'_{PRB}\}$ comprises:
  dividing the $\{I'_{TBS}, N'_{PRB}\}$ into n subsets, each subset corresponding to one mapping factor, wherein, the n is greater than or equal to 1,
  wherein, said dividing the $\{I'_{TBS}, N'_{PRB}\}$ into n subsets, each subset corresponding to one mapping factor, at least comprises one of the following:
  n=4, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2; when A5≤N'$_{PRB}$≤A6 and/or B5≤I'$_{TBS}$≤B6, the mapping factor is F3; when A7≤N'$_{PRB}$≤A8 and/or B7≤I'$_{TBS}$≤B8, the mapping factor is F4;

n=3, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2; when A5≤N'$_{PRB}$≤A6 and/or B5≤I'$_{TBS}$≤B6, the mapping factor is F3;

n=2, when A1≤N'$_{PRB}$≤A2 and/or B1≤I'$_{TBS}$≤B2, the mapping factor is F1; when A3≤N'$_{PRB}$≤A4 and/or B3≤I'$_{TBS}$≤B4, the mapping factor is F2;

the above Ai and Bi satisfy Ai≥1; Bi≥1, i=1, 2, 3, . . . , 8; the F1, F2, F3 and F4 are greater than 0.

7. The method of claim 5, wherein, the terminal selecting the mapping way according to the $\{I'_{TBS}, N'_{PRB}\}$ comprises:

for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the third rule, wherein the Ci and Di satisfy Ci≥1; Di≥1, i=1, 2, 3, 4, or, wherein, the terminal selecting the mapping way according to the $\{I'_{TBS}, N'_{PRB}\}$ comprises:

for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting a second rule, wherein, the second rule is: obtaining a TBS according to the $\{I'_{TBS}, N'_{PRB}\}$ and a mapping relationship table pre-created, and the Ci and Di satisfy Ci≥1; Di≥1, i=1, 2, 3, 4, or, wherein, the terminal selecting the mapping way according to the $\{I'_{TBS}, N'_{PRB}\}$ comprises:

for C1≤N'$_{PRB}$≤C2 and/or D≤I'$_{TBS}$≤D2, selecting the first rule; for C5≤N'$_{PRB}$≤C6 and/or D5≤I'$_{TBS}$≤D6, selecting the third rule; for C7≤N'$_{PRB}$≤C8 and/or D7≤I'$_{TBS}$≤D8, selecting the second rule, wherein, the Ci and Di satisfy Ci≥1; Di≥1, i=1, 2, 3, 4, 5, 6, 7, 8, or, wherein, the terminal selecting the mapping way according to the $\{I'_{TBS}, N'_{PRB}\}$ comprises:

for C1≤N'$_{PRB}$≤C2 and/or D1≤I'$_{TBS}$≤D2, selecting the third rule; for C3≤N'$_{PRB}$≤C4 and/or D3≤I'$_{TBS}$≤D4, selecting the second rule, wherein, the Ci and Di satisfy Ci≥1; Di≥1, i=1, 2, 3, 4.

8. The method of claim 5, wherein, the terminal selecting the mapping way according to the $\{I'_{TBS}, N'_{PRB}\}$ comprises:

when there is no CRS transmitted in a sub-frame, and a number of resource elements occupied by DMRSs is 12:

for C1≤N'$_{PRB}$≤C2 and/or D1≤I'$_{TBS}$≤D2, selecting the first rule; for C3≤N'$_{PRB}$≤C4 and/or D3≤I'$_{TBS}$≤D4, selecting the third rule;

or, for C1≤N'$_{PRB}$≤C2 and/or D≤I'$_{TBS}$≤D2, selecting the first rule; for C3≤N$_{PRB}$≤C4 and/or D3≤I'$_{TBS}$≤D4, selecting the second rule;

or, for C1≤N'$_{PRB}$≤C2 and/or D1≤I'$_{TBS}$≤D2, selecting the first rule; for C5≤N'$_{PRB}$≤C6 and/or D5≤I'$_{TBS}$≤D6, selecting the third rule; for C7≤N'$_{PRB}$≤C8 and/or D7≤I'$_{TBS}$≤D8, selecting the second rule;

wherein, the Ci and Di satisfy Ci≥1; Di≥1, i=1, 2, 3, 4, 5, 6, 7, 8.

9. The method of claim 1, wherein, the terminal selecting a mapping way comprises:

when multi-sub-frame scheduling is adopted, i.e., one transport block is transmitted in h sub-frames, selecting the first rule, and using the L-layer TBS (L=RI·h) to obtain the RI-layer TBS, wherein, the h is greater than or equal to 1, or, wherein, the terminal selecting a mapping way comprises:

when multi-sub-frame scheduling is adopted, i.e., one transport block is transmitted in h sub-frames:

when h<Y, or h≥Y and the N'$_{PRB}$≤X1, selecting the first rule, and using the L-layer TBS (L=RI·h) to obtain the RI-layer TBS, wherein, the h is greater than or equal to 1;

when h≥Y and the N'$_{PRB}$≥X2, selecting the second rule; wherein, the X 1≥1, X2≥1, Y≥1.

10. A method for determining a transport block size, comprising:

a base station performing scheduling according to channel state information reported by a terminal, determining a combination of I'$_{TBS}$ and N'$_{PRB}$, which is $\{I'_{TBS}, N_{PRB}\}$;

the base station selecting a mapping way, determining a transport block size according to the $\{I'_{TBS}, N'_{PRB}\}$, wherein, the mapping way comprises the following rule:

a first rule: using a high-layer TBS to obtain a low-layer TBS according to the $\{I'_{TBS}, N'_{PRB}\}$;

the base station performing coding on a transport block (TB) according to the TBS;

the base station transmitting coded downlink data carrying information of the TBS; wherein, said using a high-layer TBS to obtain a low-layer TBS comprises:

determining a mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, determining a TBS obtained according to the $\{I_{TBS}, N_{PRB}\}$ and a related TBS mapping relationship table as the low-layer TBS; wherein, said obtaining $\{I_{TBS}, N_{PRB}\}$ according to the $\{I'_{TBS}, N'_{PRB}\}$ and the mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the L≥RI, the F is a mapping factor, the F is a real number greater than 0, round represents taking a nearest integer, and in the first rule, the L, RI represent that an RI-layer TBS is obtained according to an L-layer TBS, and L>RI; in the third rule, L=RI.

11. A terminal, comprising hardware performing instructions stored in a non-transitory computer readable medium which executes steps in following units:

a first determination unit, configured to receive downlink control signaling transmitted by a base station, and obtain a combination of I'$_{TBS}$ and N'$_{PRB}$, which is $\{I_{TBS}, N'_{PRB}\}$, according to the downlink control signaling;

a second determination unit, configured to select a mapping way, determine a transport block size (TBS) according to the $\{I'_{TBS}, N'_{PRB}\}$, wherein, the mapping way comprises the following rule:

a first rule: using a high-layer TBS to obtain a low-layer TBS according to the $\{I'_{TBS}, N'_{PRB}\}$;

a decoding unit, configured to decode a downlink data according to the TBS; wherein, the second determination unit being configured to use a high-layer TBS to obtain a low-layer TBS comprises:

determining a mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, determining a TBS obtained according to the $\{I_{TBS}, N_{PRB}\}$ and a TBS mapping relationship table as the low-layer TBS; wherein, the second determination unit being configured to obtain $\{I_{TBS}, N_{PRB}\}$ according to the $\{I'_{TBS}, N'_{PRB}\}$ and the mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the L≥RI, the F is a mapping factor, the F is a real number greater than 0, round represents obtaining a nearest integer, and in the first rule, the L, RI represent that an RI-layer TBS is obtained according to an L-layer TBS, and L>RI; in the third rules, L=RI.

12. The terminal of claim 11, wherein, the second determination unit is further configured to, only when a predetermined condition is satisfied, select the mapping way, the predetermined condition includes at least one of the following conditions:

a number of resource elements which can be used in one resource block is greater than a pre-set value;

or it is a scenario that there is no cell-specific reference signal transmitted in a sub-frame, and a number of the resource elements occupied by demodulation reference signals is 12;

or it is a multi-sub-frame scheduling scenario, i.e., a transport block is transmitted in a plurality of sub-frames.

13. The terminal of claim 12, wherein, the pre-set value is 120, 136 or 168.

14. The terminal of claim 11, wherein, the second determination unit being configured to use a high-layer TBS to obtain a low-layer TBS at least comprises one of the following:

using a TBS with L=2 to obtain a TBS with RI=1;

using a TBS with L=3 to obtain a TBS with RI=1 or a TBS with RI=2;

using a TBS with L=4 to obtain a TBS with RI=1 or a TBS with RI=2 or a TBS with RI=3;

wherein, L is a number of high layers, RI is a number of low layers.

15. The terminal of claim 11, wherein, the second determination unit being configured to select a mapping way comprises:

selecting one of the first rule, and third rule for all the $\{I'_{TBS}, N'_{PRB}\}$; wherein the third rule is: determining the mapping factor according to the $\{I'_{TBS}, N'_{PRB}\}$, obtaining $\{I_{TBS}, N_{PRB}\}$ according to the $\{I'_{TBS}, N'_{PRB}\}$ and the mapping factor, and then determining a TBS according to the $\{I_{TBS}, N_{PRB}\}$ and a related one-layer TBS mapping relationship table, wherein the mapping factor is a real number greater than 0, or, selecting the mapping way according to the $\{I'_{TBS}, N'_{PRB}\}$.

16. The terminal of claim 1, wherein, the second determination unit being configured to determine a mapping factor according to the $\{I'_{TBS}, N'_{PRB}\}$ comprises:

dividing the $\{I'_{TBS}, N'_{PRB}\}$ into n subsets, each subset corresponding to one mapping factor, wherein, the n is greater than or equal to 1, wherein, the second determination unit being configured to divide the $\{I'_{TBS}, N'_{PRB}\}$ into n subsets, each subset corresponding to one mapping factor, at least comprises one of the following:

n=4, when A1≤$N'_{PRB}$≤A2 and/or B1≤$I'_{TBS}$≤B2, the mapping factor is F1; when A3≤$N'_{PRB}$≤A4 and/or B3≤$I'_{TBS}$≤B4, the mapping factor is F2; when A5≤$N'_{PRB}$≤A6 and/or B5≤$I'_{TBS}$≤B6, the mapping factor is F3; when A7≤$N'_{PRB}$≤A8 and/or B7≤$I'_{TBS}$≤B8, the mapping factor is F4;

n=3, when A1≤$N'_{PRB}$≤A2 and/or B1≤$I'_{TBS}$≤B2, the mapping factor is F1; when A3≤$N'_{PRB}$≤A4 and/or B3≤$I'_{TBS}$≤B4, the mapping factor is F2; when A5≤$N'_{PRB}$≤A6 and/or B5≤$I'_{TBS}$≤B6, the mapping factor is F3;

n=2, when A1≤$N'_{PRB}$≤A2 and/or B1≤$I'_{TBS}$≤B2, the mapping factor is F1; when A3≤$N'_{PRB}$≤A4 and/or B3≤$I'_{TBS}$≤B4, the mapping factor is F2;

the above Ai and Bi satisfy Ai≥1; Bi≥1, i=1, 2, 3, . . . , 8;

the F1, F2, F3 and F4 are greater than 0.

17. The terminal of claim 15, wherein, the second determination unit being configured to select a mapping way according to the $\{I'_{TBS}, N'_{PRB}\}$ comprises:

for C1≤$N'_{PRB}$≤C2 and/or D1≤$I'_{TBS}$≤D2, selecting the first rule; for C3≤$N'_{PRB}$≤C4 and/or D3≤$I'_{TBS}$≤D4, selecting the third rule, wherein, the Ci and Di satisfy Ci≥1; Di≥1, i=1, 2, 3, 4, or, wherein, the second determination unit being configured to select the mapping way according to the $\{I'_{TBS}, N'_{PRB}\}$ comprises:

for C1≤$N'_{PRB}$≤C2 and/or D≤$I'_{TBS}$≤D2, selecting the first rule; for C3≤$N'_{PRB}$≤C4 and/or D3≤$I'_{TBS}$≤D4, selecting a second rule, wherein, the second rule is: obtaining a TBS according to the $\{I'_{TBS}, N'_{PRB}\}$ and a mapping relationship table pre-created, and the Ci and Di satisfy Ci≥1; Di≥1, i=1, 2, 3, 4, or, wherein, the second determination unit being configured to select the mapping way according to the $\{I'_{TBS}, N'_{PRB}\}$ comprises:

for C1≤$N'_{PRB}$≤C2 and/or D≤$I'_{TBS}$≤D2, selecting the first rule; for C5≤$N'_{PRB}$≤C6 and/or D5≤$I'_{TBS}$≤D6, selecting the third rule; for C7≤$N'_{PRB}$≤C8 and/or D7≤$I'_{TBS}$≤D8, selecting the second rule, wherein, the Ci and Di satisfy Ci≥1; Di≥1, i=1, 2, 3, 4, 5, 6, 7, 8, or, wherein, the second determination unit being configured to select the mapping way according to the $\{I'_{TBS}, N'_{PRB}\}$ comprises:

for C1≤$N'_{PRB}$≤C2 and/or D1≤$I'_{TBS}$≤D2, selecting the third rule; for C3≤$N'_{PRB}$≤C4 and/or D3≤$I'_{TBS}$≤D4, selecting the second rule, wherein, the Ci and Di satisfy Ci≥1; Di≥1, i=1, 2, 3, 4.

18. The terminal of claim 15, wherein, the second determination unit being configured to select the mapping way according to the $\{I'_{TBS}, N'_{PRB}\}$ comprises:

when there is no CRS transmitted in a sub-frame, and a number of resource elements occupied by DMRSs is 12:

for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the third rule;

or, for $C1 \leq N'_{PRB} \leq C2$ and/or $D1 \leq I'_{TBS} \leq D2$, selecting the first rule; for $C3 \leq N'_{PRB} \leq C4$ and/or $D3 \leq I'_{TBS} \leq D4$, selecting the second rule;

or, for $C1 \leq N'_{PRB} \leq C2$ and/or $D \leq I'_{TBS} \leq D2$, selecting the first rule; for $C5 \leq N'_{PRB} \leq C6$ and/or $D5 \leq I'_{TBS} \leq D6$, selecting the third rule; for $C7 \leq N'_{PRB} \leq C8$ and/or $D7 \leq I'_{TBS} \leq D8$, selecting the second rule;

wherein, the Ci and Di satisfy $Ci \geq 1$; $Di \geq 1$, $i = 1, 2, 3, 4, 5, 6, 7, 8$.

19. The terminal of claim 11, wherein: the second determination unit being configured to select a mapping way comprises:

when multi-sub-frame scheduling is adopted, i.e., one transport block is transmitted in h sub-frames, selecting the first rule, and using the L-layer TBS (L=RI·h) to obtain the RI-layer TBS, wherein, the h is greater than or equal to 1, or, wherein: the second determination unit being configured to select a mapping way comprises:

when multi-sub-frame scheduling is adopted, i.e., one transport block is transmitted in h sub-frames:

when $h < Y$, or $h \geq Y$ and the $N'_{PRB} \leq X1$, selecting the first rule, and using the L-layer TBS (L=RI·h) to obtain the RI-layer TBS, wherein, the h is greater than or equal to 1;

when $h \geq Y$ and the $N'_{PRB} \geq X2$, selecting the second rule; wherein, the $X1 \geq 1$, $X2 \geq 1$, $Y \geq 1$.

20. A base station, comprising hardware performing instructions stored in a non-transitory computer readable medium which executes steps in following units:

a third determination unit, configured to perform scheduling according to channel state information reported by a terminal, determine a combination of $I'_{TBS}$ and $N'_{PRB}$, which is $\{I'_{TBS}, N'_{PRB}\}$;

a fourth determination unit, configured to select a mapping way, determine a transport block size (TBS) according to the $\{I'_{TBS}, N'_{PRB}\}$, wherein, the mapping way comprises the following rule:

a first rule: using a high-layer TBS to obtain a low-layer TBS according to the $\{I'_{TBS}, N'_{PRB}\}$;

a coding unit, configured to perform coding on a transport block (TB) according to the TBS; and a transmission unit, configured to transmit coded downlink data carrying information of the TBS; wherein, the fourth determination unit is further configured to use a high-layer TBS to obtain a low-layer TBS comprises:

determining a mapping factor according to the $\{I'_{TBS}, N'_{PRB}\}$, obtaining $\{I_{TBS}, N'_{PRB}\}$ according to the $\{I'_{TBS}, N'_{PRB}\}$ and the mapping factor, determining a TBS obtained according to the $\{I_{TBS}, N_{PRB}\}$ and a TBS mapping relationship table as the low-layer TBS; wherein, the second determination unit being configured to obtain $\{I_{TBS}, N_{PRB}\}$ according to the $\{I'_{TBS}, N'_{PRB}\}$ and the mapping factor comprises:

$$I_{TBS} = I'_{TBS}, N_{PRB} = \min\left(\left\lfloor \frac{N'_{PRB} \times F \times RI}{L} \right\rfloor, 110\right);$$

or, $$I_{TBS} = I'_{TBS}, N_{PRB} = \min\left(\left\lceil \frac{N'_{PRB} \times F \times RI}{L} \right\rceil, 110\right);$$

or, $$I_{TBS} = I'_{TBS}, N_{PRB} = \min\left(\text{round}\left(\frac{N'_{PRB} \times F \times RI}{L}\right), 110\right);$$

wherein, the $L \geq RI$, the F is a mapping factor, the F is a real number greater than 0, round represents obtaining a nearest integer, and in the first rule, the L, RI represent that an RI-layer TBS is obtained according to an L-layer TBS, and $L > RI$; in the third rules, $L = RI$.

* * * * *